(12) United States Patent
Takeda

(10) Patent No.: US 6,738,571 B2
(45) Date of Patent: May 18, 2004

(54) LENS DEVICE AND VIBRATION-PROOF ADAPTER

(75) Inventor: Toshiaki Takeda, Saitama (JP)

(73) Assignee: Fuji Photo Optical Co., Ltd, Saitama (JP)

(*) Notice: Subject to any disclaimer, the term of this patent is extended or adjusted under 35 U.S.C. 154(b) by 0 days.

(21) Appl. No.: 10/102,882

(22) Filed: Mar. 22, 2002

(65) Prior Publication Data

US 2002/0141061 A1 Oct. 3, 2002

(30) Foreign Application Priority Data

Mar. 30, 2001 (JP) ..................................... 2001-100397
Mar. 30, 2001 (JP) ..................................... 2001-100486

(51) Int. Cl.[7] .............................................. G03B 17/00
(52) U.S. Cl. ........................... 396/55; 396/52; 396/53; 396/54; 359/554; 359/555
(58) Field of Search ............................. 396/3, 52, 53, 396/54, 55, 529, 531, 532; 359/554, 555, 556, 557, 694, 695, 696, 697, 698, 699, 700, 701, 702, 703, 704, 705, 706; 348/208

(56) References Cited

U.S. PATENT DOCUMENTS 5,842,052 A   11/1998  Okano ........................ 396/55
5,850,576 A   12/1998  Matsuzawa ................... 396/55
6,295,412 B1   9/2001  Katano et al. ................ 396/55

FOREIGN PATENT DOCUMENTS

| JP | 06189181 A | 7/1994 |
| JP | 11284900 A | 10/1999 |
| JP | 2000002901 A | 1/2000 |
| JP | 2000039638 A | 2/2000 |

Primary Examiner—Drew Dunn
Assistant Examiner—Joshua L Pritchett
(74) Attorney, Agent, or Firm—Birch, Stewart, Kolasch & Birch, LLP

(57) ABSTRACT

The lens device and the vibration-proof adapter include a lock mechanism with operational ease because a lock mechanism of a vibration-proof lens has a switch on a joint with a camera main body or a joint with the lens device. The lens device is connected by placing a hook, which is provided on a front end face of a camera main body, to a recess of a back end face. A slide pin is provided in the recess so as to slide, and is pressed inside by the hook. In synchronization with the slide pin pressed inside, a lock pin operates to move away from a holding member of a vibration-proof lens, and the vibration-proof lens is unlocked. The slide pin returns to an original protruding position to lock the vibration-proof lens again when the hook is detached from the recess.

6 Claims, 18 Drawing Sheets

LENS DEVICE AND VIBRATION-PROOF ADAPTER

BACKGROUND OF THE INVENTION

1. Field of the Invention

The present invention relates to a lens device and a vibration-proof adapter and in particular to a lens device and a vibration-proof adapter that has a vibration-proof lens for correcting a blurred image resulted from vibration on a camera when a TV camera is used for a sports broadcast or on a scaffold outdoors.

2. Description of the Related Art

Conventionally, a camera having such a vibration-proof lens supports the vibration-proof lens movably inside a surface perpendicular to an image-taking optical axis in a lens barrel of the camera. When the camera is vibrated, the vibration-proof lens is moved by an actuator in a direction of canceling the vibration to correct a blurred image. Such a camera has a lock mechanism for fixing the vibration-proof lens onto the lens barrel to prevent the vibration-proof lens from being moved and damaged when the camera is conveyed.

Japanese Patent Application Publication No. 2000-2901 discloses a lock mechanism in which a lens holding frame of a vibration-proof lens is clamped and held by rotating an operating ring to lock the vibration-proof lens onto a lens barrel. However, in this lock mechanism, when the operating ring is moved by mistake during conveyance of a lens device, the vibration-proof lens may be unlocked. Further, Japanese Patent Application Publication No. 2000-39638 discloses a lock mechanism in which a lens holding frame of a vibration-proof lens is pressed and held by sliding a lock ring to lock the vibration-proof lens onto a lens barrel. In this lock mechanism, since a lens cap is attached on the lens barrel, the vibration-proof lens is conveyed while being positively locked. However, when the lens cap fails to be placed thereon, it is not possible to guarantee a locking state of the vibration-proof lens.

Furthermore, in these lock mechanisms, every time the lens device is attached and detached to and from a camera main body, it is necessary to operate the operating ring and the locking ring to lock and unlock the vibration-proof lens. Hence, more operational ease has been demanded. Such a problem has been also found on a vibration-proof adapter placed between a lens device and a camera main body to correct a blurred image.

Japanese Patent Application Publication No. 6-189181 discloses an intermediate adapter (vibration-proof adapter), which is detachably attached between a camera and a lens device. The vibration-proof adapter has a variable vertex angle prism corresponding to a vibration-proof lens, a vibration detecting sensor, a variable vertex angle prism driving circuit, and so on therein. The variable vertex angle prism driving circuit moves the variable vertex angle prism and decenters an optical axis according to vibration information detected by the vibration detecting sensor. Thus, a blurred image is corrected.

Japanese Patent Application Publication No. 11-284900 discloses a usage pattern in which a lens device is connected to the front of a vibration-proof device (vibration-proof adapter) and a camera is connected to the back of the vibration-proof adapter.

However, Japanese Patent Application Publication Nos. 6-189181 and 11-284900 fail to disclose a connecting structure for connecting a vibration-proof adapter to a camera. A vibration-proof adapter is hard to hold because it weighs about 3 to 4 kg with a thin shape. Hence, it is necessary to connect a vibration-proof adapter to a camera or a lens device while putting a hand on a connecting surface with the camera or a connecting surface with the lens device. Thus, a hand may be caught between the vibration-proof adapter and the camera or between the vibration-proof adapter and the lens device.

SUMMARY OF THE INVENTION

The present invention has been developed in view of the above-described circumstances, and has as its object the provision of a lens device and a vibration-proof adapter that cause no operating error on a lock mechanism of a vibration-proof lens and achieve operational ease for the lock mechanism.

Another object of the present invention is to provide a vibration-proof adapter connected to a camera or a lens device with safety and ease.

In order to attain the above objects, the present invention is directed to a lens device to be connected to a camera main body, the lens device correcting a blurred image resulted from vibration of the camera main body, the lens device comprising: a lens barrel; a vibration-proof lens movably arranged in the lens barrel, the vibration-proof lens being moved to correct the blurred image; a joint with which the lens device is connected to the camera main body; and a lock mechanism which locks the vibration-proof lens, the lock mechanism having a switch which detects connection and disconnection of the joint with the camera main body, wherein the lock mechanism unlocks the vibration-proof lens when the switch detects the connection of the joint with the camera main body, and the lock mechanism locks the vibration-proof lens when the switch detects the disconnection of the joint from the camera main body.

According to the present invention, since the switch of the lock mechanism is provided on the joint for the camera main body, the switch is operated in response to attachment and detachment of the camera to/from the joint. Therefore, since the vibration-proof lens is automatically locked and unlocked, it is possible to eliminate the inconvenience of operating the lock mechanism for each attachment and detachment.

Preferably, the switch is provided on a recess of the joint, and the switch is not operated by mistake when the lens device is conveyed.

Further, in order to attain the above objects, the present invention is directed to a vibration-proof adapter to be connected between a camera main body and a lens device, the vibration-proof adapter correcting a blurred image resulted from vibration of at least one of the camera main body and the lens device, the vibration-proof adapter comprising: a lens barrel; a vibration-proof lens movably arranged in the lens barrel, the vibration-proof lens being moved to correct the blurred image; a joint with which the vibration-proof adapter is connected to the camera main body; and a lock mechanism which locks the vibration-proof lens, the lock mechanism having a switch which detects connection and disconnection of the joint with the camera main body, wherein the lock mechanism unlocks the vibration-proof lens when the switch detects the connection of the joint with the camera main body, and the lock mechanism locks the vibration-proof lens when the switch detects the disconnection of the joint from the camera main body.

The present invention is also directed to a vibration-proof adapter to be connected between a camera main body and a lens device, the vibration-proof adapter correcting a blurred image resulted from vibration of at least one of the camera main body and the lens device, the vibration-proof adapter comprising: a lens barrel; a vibration-proof lens movably arranged in the lens barrel, the vibration-proof lens being moved to correct the blurred image; a joint with which the vibration-proof adapter is connected to the lens device; and a lock mechanism which locks the vibration-proof lens, the lock mechanism having a switch which detects connection and disconnection of the joint with the lens device, wherein the lock mechanism unlocks the vibration-proof lens when the switch detects the connection of the joint with the lens device, and the lock mechanism locks the vibration-proof lens when the switch detects the disconnection of the joint from the lens device.

According to the present invention, since the switch of the lock mechanism is provided on the joint for the camera main body or the joint for the lens device, the switch is operated in response to attachment and detachment of the camera main body or the lens device to/from the joint. Therefore, since the vibration-proof lens is automatically locked and unlocked, it is possible to eliminate the inconvenience of operating the lock mechanism for each attachment and detachment.

Preferably, the switch is provided on the recess of the joint, and the switch is not operated by mistake when the vibration-proof adapter is conveyed.

Furthermore, in order to attain the above-mentioned objects, the present invention is directed to a vibration-proof adapter which is connected between a camera and a lens device, the vibration-proof adapter being characterized in that a grip is attached on a part other than connecting surfaces for the camera and the lens device on a main body case of the vibration-proof adapter.

According to the present invention, the grip is attached on the part other than the connecting surfaces to be connected to the camera and the lens device. Thus, a hand is not caught between the vibration-proof adapter and the camera or the lens device, thereby improving safety.

Preferably, a gripping part of the grip is placed on a position shifted from a center of gravity of the vibration-proof adapter to the lens device or the camera. Thus, when the gripping part is held, the vibration-adapter is lifted while being inclined. Therefore, for example, when the vibration-proof adapter and the camera is connected to each other by engaging hooks, the hooks are readily engaged to each other due to inclination of the vibration-proof adapter, thereby making connection with ease.

More preferably, the grip is retractable in a receiving part provided at the main body case, and the grip does not become an obstacle or is not in contact with the lens device when it is not used.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder preferred embodiments will be described in detail for a lens device and a vibration-proof adapter of the present invention in accordance with the accompanied drawings.

Figure 1:
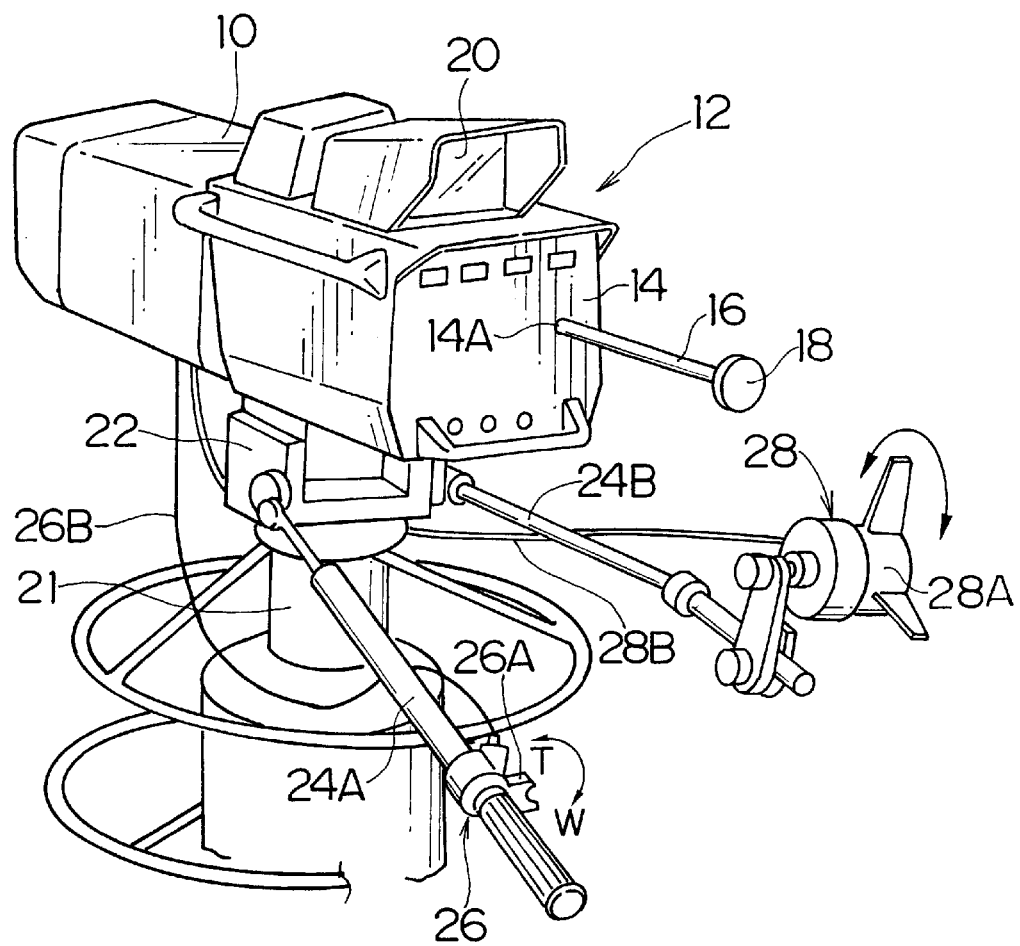
FIG. 1 is a perspective view showing a TV camera device using a lens device of an embodiment.

FIG. 1 shows a TV camera device 12 using a lens device 10 according to an embodiment of the present invention. The TV camera device 12 is capable of zooming and focusing according to an operating system of a uniaxial two-operation type and is mainly composed of an EFP lens device (hereinafter, referred to as a lens device) 10 and a camera main body 14.

The camera main body 14 is detachably attached on a pan head 22, which is provided on a tripod or a pedestal 21. An operating rod 16 is detachable on the lens device 10 and is disposed with extending through the camera main body 14. The operating rod 16 is inserted into an operating rod through hole 14A formed on the camera main body 14, and the front end of the operating rod 16 is connected to a lens driving section (not shown) of the lens device 10.

A cameraperson holds a grip 18 of the operating rod 16 while viewing a picture on a view finder 20 disposed on the camera main body 14 in FIG. 1, and the cameraperson can zoom by pushing and pulling the operating rod 16 and can adjust focus by rotating the grip 18 and the operating rod 16.

A zoom rate demand 26 and a focus position demand 28 can be provided on pan/tilt rods 24A and 24B extended from the pan head 22. A cameraperson can perform a zooming operation by rotating a thumb ring 26A of the zoom rate demand 26 with a thumb and can perform a focusing operation by rotating a focus knob 28A of the focus position demand 28.

A zoom speed instructing signal, which instructs a zooming speed according to a direction and an amount of operating the thumb ring 26A, is outputted from the zoom rate demand 26. A focus position instructing signal, which instructs a focusing position according to a rotating position of the focus knob 28A, is outputted from the focus position demand 28. These instructing signals are transmitted to the lens device 10 via cables 26B and 28B.

Figure 2:
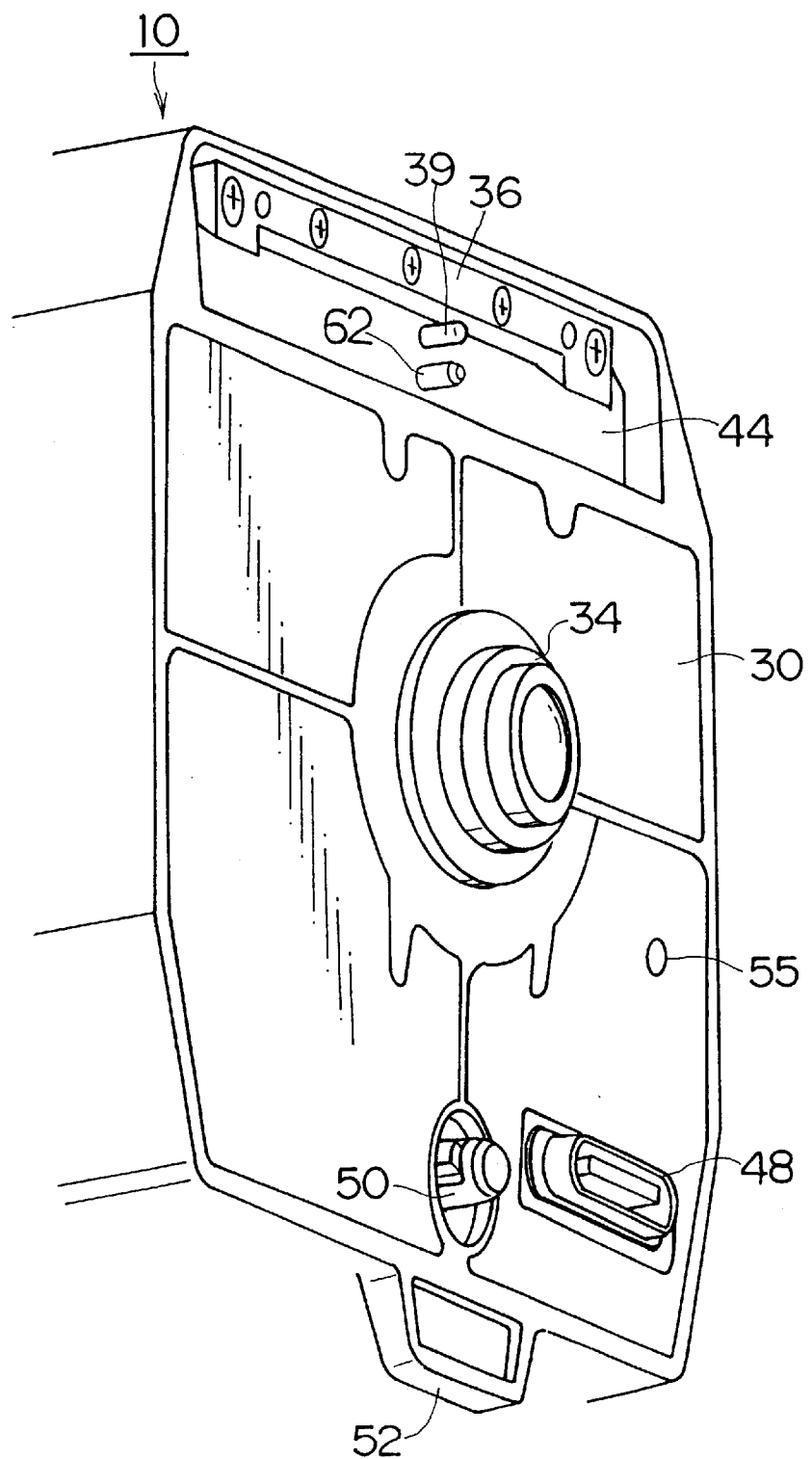
FIG. 2 is a perspective view showing a back end face of the lens device show in FIG. 1.
Figure 3:
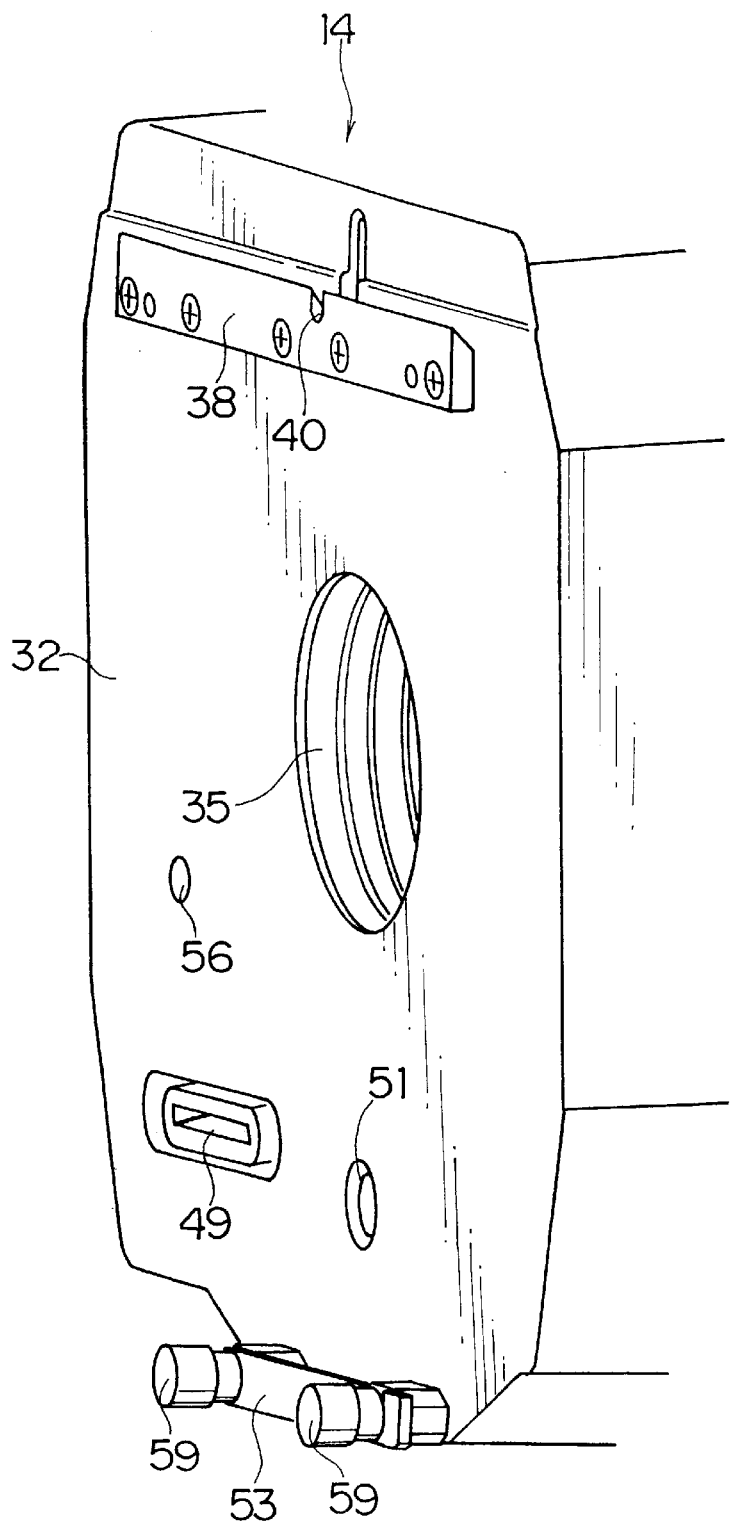
FIG. 3 is a perspective view showing a front end face of a TV main body shown in FIG. 1.

FIG. 2 is a perspective view showing a back end face 30 of the lens device 10. Further, FIG. 3 is a perspective view showing a front end face 32 of the camera main body 14. The back end face 30 in FIG. 2 is connected to the front end face 32 in FIG. 3.

A bayonet mount 34 is protruded substantially at the center of the back end face 30 in FIG. 2, and a recess 35 is formed for allowing the bayonet mount 34 to escape substantially at the center of the front end face 32 in FIG. 3. The bayonet mount 34 is used for connecting a hand-held camera such as an ENG camera. When a box-type camera main body 14 in FIG. 1 is connected, connection is made by using a hook 36 provided on the upper part of the back end face 30 in FIG. 2.

The hook 36 is engaged to a hook 38 provided on the upper part of the front end face 32 in FIG. 3. Each of the hooks 36 and 38 has an inclined surface formed with a gradient of about 45°. An optical axis of the camera main body 14 and an optical axis of the lens device 10 conform to each other in a vertical direction by engaging the inclined surfaces. A positioning pin 39 is protruded at the center of the hook 36 in FIG. 2, and the pin 39 is engaged to a groove 40, which is formed at the center of the hook 38 shown in FIG. 3. An optical axis of the camera main body 14 and an optical axis of the lens device 10 conform to each other in a horizontal direction by engaging the pin 39 to the groove 40.

A slide pin 62 serving as a switch of a lock mechanism is protruded below the hook 36 in FIG. 2. The slide pin 62 is provided in a recess 44. When the hook 38 in FIG. 3 is fit into the recess 44, the switch of the lock mechanism is turned on by the pressing of the hook 38. The lock mechanism will be discussed in detail later.

A connector 48 is provided on the lower right corner of the back end face 30 in FIG. 2. The connector 48 is connected to a connector 49 provided on the lower left corner of the front end face 32 in FIG. 3. The connection between the connector 48 and the connector 49 can transmit information about a focal length and so on from the lens device 10 to the camera main body 14.

A pin 50 with spring is protruded at the lower center of the back end face 30 in FIG. 2. The pin 50 is fit into a recess 51 formed at the lower center of the front end face 32 in FIG. 3.

A supporting plate 52 is formed so as to protrude downward on the lower part of the back end face 30 in FIG. 2. The supporting plate 52 is inserted between the front end face 32 and a holding plate 53, which is provided on the lower part of the front end face 32 in FIG. 3, and the supporting plate 52 is pressed and held by fastening screws 59.

Besides, reference numeral 55 in FIG. 2 and reference numeral 56 in FIG. 3 denote holes for inserting the operating rod 16 in FIG. 1.

Figure 4:
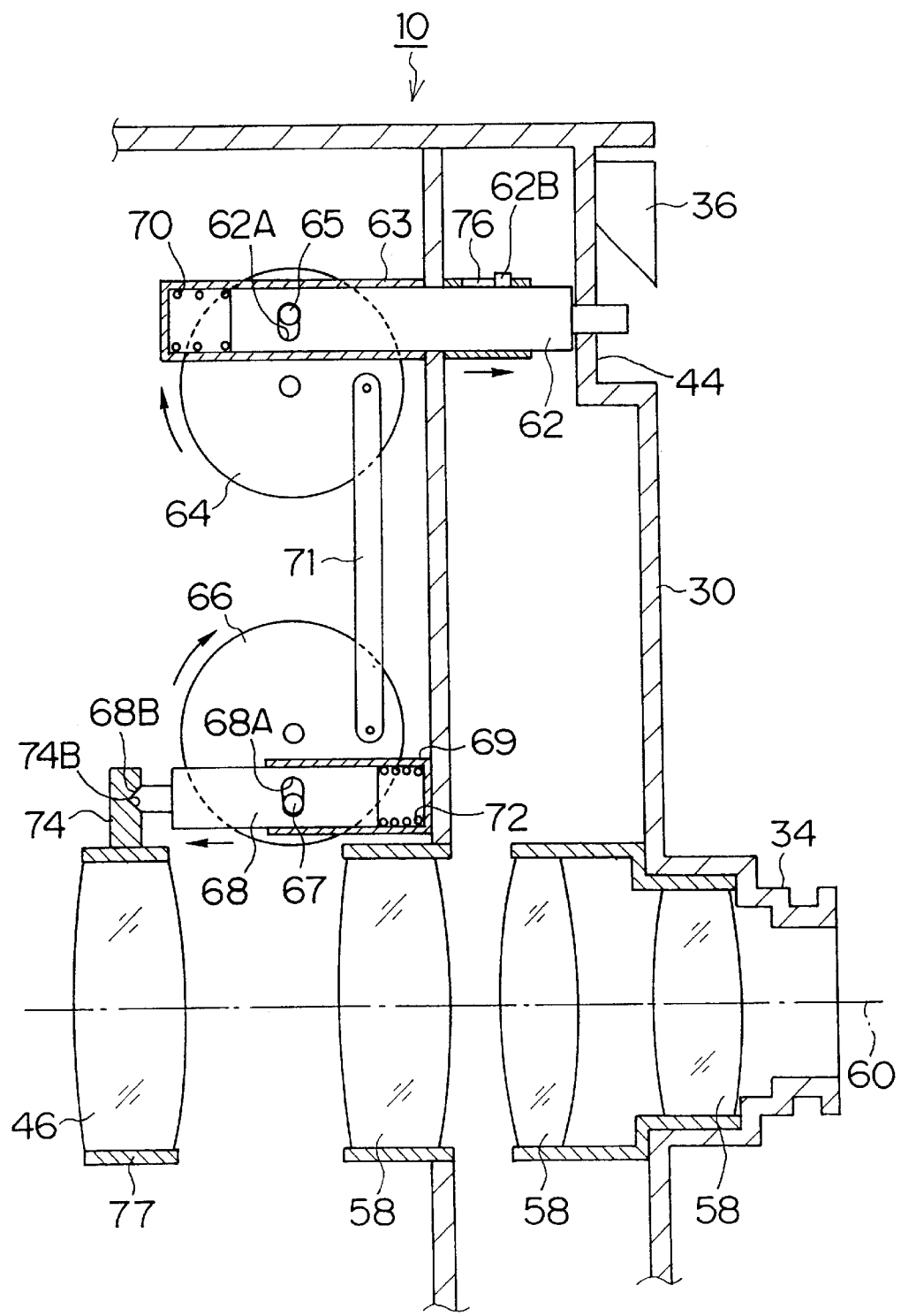
FIG. 4 is a sectional view schematically showing a lock mechanism in a state in which a vibration-proof lens is locked.
Figure 5:
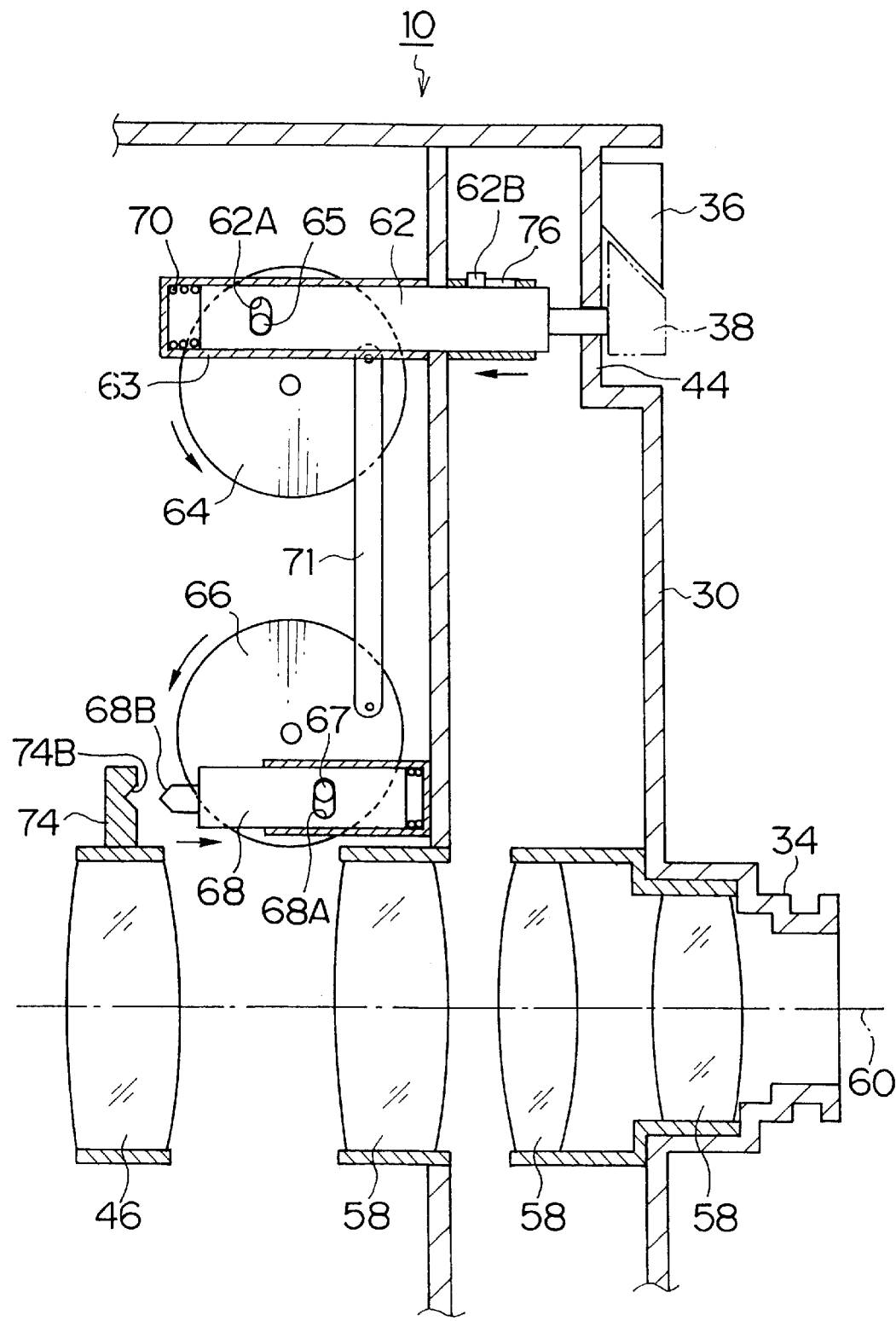
FIG. 5 is a sectional view schematically showing the lock mechanism in a state in which the vibration-proof lens is unlocked.

FIGS. 4 and 5 are sectional views schematically showing the lock mechanism of a vibration-proof lens 46. FIG. 4 shows a locking state in which the vibration-proof lens 46 is locked, and FIG. 5 is an unlocking state in which the vibration-proof lens 46 is unlocked.

As shown in these drawings, master lenses 58 are provided inside the bayonet mount 34, and the vibration-proof lens 46 is provided on the front end side of the master lenses 58. The vibration-proof lens 46 is movably supported inside a plane perpendicular to an optical axis 60, and correction is made by moving the vibration-proof lens 46 with a vibration-proof mechanism.

The lock mechanism for locking the vibration-proof lens 46 is mainly composed of a slide pin 62, a first table 64, a second table 66, and a lock pin 68.

The slide pin 62 is guided by a guide member 63 and is supported so as to slide in a direction of the optical axis 60. A spring 70 is provided on the bottom end side of the slide pin 62, and the slide pin 62 is energized by the spring 70 in a right direction in FIG. 4. The front end of the slide pin 62 penetrates the bottom of the recess 44 of the back end face 30 and protrudes from the bottom. Therefore, as shown in FIG. 5, when the hook 38 is inserted into the recess 44 and is engaged to the hook 36, the slide pin 62 is pressed inside by the hook 38 and slides in a left direction in FIG. 5. Further, as shown in FIG. 4, when the hook 38 is taken out from the recess 44, the slide pin 62 slides in a right direction by energization of the spring 70 and returns to an original protruding position. Besides, the slide pin 62 on the protruding position is placed inside the recess 44. Moreover, a protruding part 62B is formed on the slide pin 62. The protruding part 62B prevents the slide pin 62 from rotating in a circumferential direction, by the relationship of a key, which is engaged to a long groove 76 formed in a direction of the optical axis 60, and a key groove.

A groove 62A is formed in a vertical direction on the outer peripheral surface of the slide pin 62, and a pin 65 is engaged to the groove 62A. The pin 65 protrudes at an off-center position of the first table 64, which is rotatably supported. The first table 64 is connected to the second table 66 via a link rod 71. Thus, when the slide pin 62 slides, the first table 64 rotates due to the engagement between the groove 62A and the pin 65, and the second table 66 rotates in synchronization with the first table 64 via the link rod 71.

A pin 67 protrudes at an off-center position of the second table 66. The pin 67 is engaged to a groove 68A formed in a vertical direction on the outer peripheral surface of a lock pin 68. The lock pin 68 is supported by a guide member 69 so as to slide in the direction of the optical axis 60, and is energized in a left direction in FIG. 4 by a spring 72 provided on the bottom end side. Therefore, the lock pin 68 slides in parallel with the optical axis 60 in synchronization with the rotation of the second table 66.

A taper 68B is formed on the front end of the lock pin 68, and the taper 68B is brought into contact with a taper 74B formed on a holding member 74 of the vibration-proof lens 46. As shown in FIG. 4, when the taper 68B and the taper 74B are in contact with each other, the vibration-proof lens 46 is fixed (locked) such that its optical axis conforms to the optical axis 60 of the master lens 58. Further, as shown in FIG. 5, when the taper 68B and the taper 74B are separated from each other, the vibration-proof lens 46 is unlocked and can move on a plane perpendicular to the optical axis 60.

In the lock mechanism of the vibration-proof lens 46 configured thus, as shown in FIG. 5, the slide pin 62 slides in a left direction in FIG. 5 by placing the hook 38 into the recess 44, the first table 64 and the second table 66 rotate counterclockwise, and the lock pin 68 slides in a right direction in FIG. 5 to unlock the vibration-proof lens 46. Moreover, as shown in FIG. 4, the slide pin 62 slides in a right direction in FIG. 4 by taking out the hook 38 from the recess 44, the first table 64 and the second table 66 rotate clockwise, and the lock pin 68 slides in a left direction in FIG. 4 to lock the vibration-proof lens 46.

Figure 6:
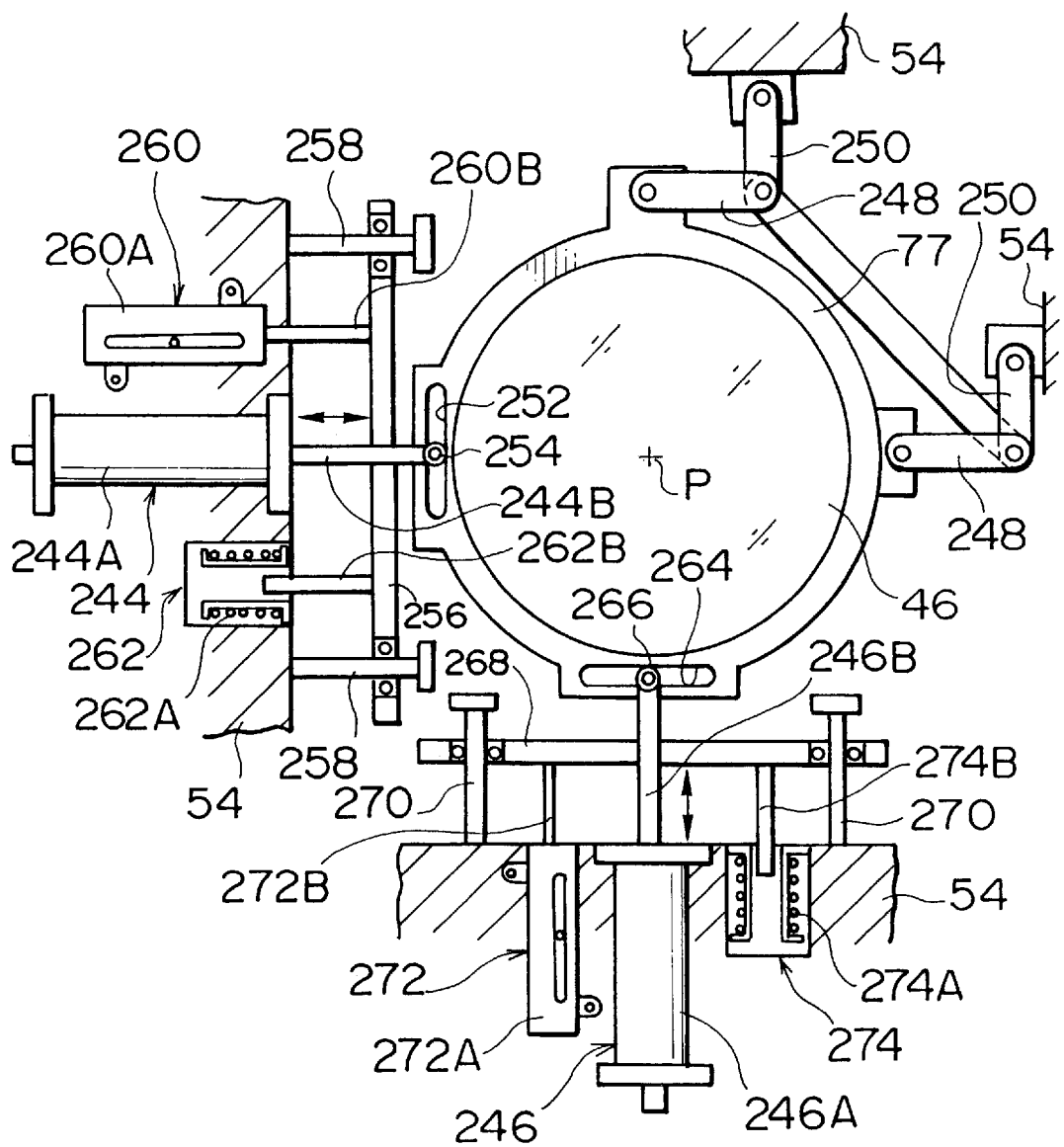
FIG. 6 is a front view showing a support structure of the vibration-proof lens.

Next, an example of a vibration-proof mechanism used for the lens device 10 will be discussed. As shown in FIG. 6, the vibration-proof lens 46 is moved by linear motors 244 and 246 inside a plane perpendicular to an image-taking optical axis P in a direction for correcting a blurred image. The vibration lens 46 is movably supported inside the back end face 30 via a parallel link mechanism composed of four arms 248 and 250.

The linear motor 244 moves the vibration-proof lens 46 in a horizontal direction in FIG. 6 and is composed of a motor main body 244A and a rod 244B. The motor main body 244A is fixed on a back plate 54 of the lens device 10, and the front end of the rod 244B is engaged to a long hole 252 of a lens frame 77 via a roller 254. The long hole 252 is formed in a vertical direction in FIG. 6 on the left side of the lens frame 77. The long hole 252 and the roller 254 are engaged to each other movably in a vertical direction in FIG. 6.

When the rod 244B slides by driving force of the motor main body 244A, the vibration-proof lens 46 is pushed and pulled by the rod 244B to move in a horizontal direction in FIG. 6.

A connecting frame 256 is fixed to the rod 244B of the linear motor 244. The connecting frame 256 is disposed in a vertical direction in FIG. 6 and has the rod 244B fixed at the center. The upper and lower ends of the connecting frame 256 are supported by linear guides 258 so as to slide. The linear guides 258 are disposed in parallel with the rod 244B. When the rod 244B slides, the connecting frame 256 moves horizontally in parallel while keeping its posture.

The front end of a detecting contacting needle 260B of a position sensor 260 is pressed and brought into contact with the connecting frame 256. The position sensor 260 has a sensor main body 260A fixed on the back plate 54 at a position where the detecting contacting needle 260B is in parallel, with the rod 244B. The position sensor 260 detects a moving amount of the connecting frame 256, which moves in parallel by sliding of the rod 244B.

Reference numeral 262A denotes bobbins constituting a speed generator 262. Reference numeral 262B denotes a core constituting the speed generator 262. The core 262B is fixed to the connecting frame 256.

Meanwhile, a linear motor 246 moves the vibration-lens 46 in a vertical direction in FIG. 6 and is composed of a motor main body 246A and a rod 246B. The motor main body 246A is fixed to a back plate 54, the front end of the rod 246B is engaged to a long hole 264 of the lens frame 77 via a roller 266. The long hole 264 is formed on the lower part of the lens frame 77 in a horizontal direction in FIG. 6. The long hole 264 and the roller 266 are engaged to each other movably in a horizontal direction in FIG. 6.

When the rod 246B slides by driving force of the motor main body 246A, the vibration-proof lens 46 is pushed and pulled by the rod 246B to move in a vertical direction in FIG. 6.

A connecting frame 268 is fixed to the rod 246B of the linear motor 246. The connecting frame 268 is disposed in a horizontal direction in FIG. 6 and has the rod 246B fixed at the center. The right and left ends of the connecting frame 268 are supported by linear guides 270 so as to slide. The linear guides 270 are disposed in parallel with the rod 246B. When the rod 246B slides, the connecting frame 268 moves vertically in parallel while keeping its posture.

The front end of a detecting contacting needle 272B of a position sensor 272 is pressed and brought into contact with the connecting frame 268. The position sensor 272 has the detecting contacting needle 272B fixed in parallel with the rod 246B and a sensor main body 272A fixed on the back plate 54. The position sensor 272 detects a moving amount of the connecting frame 268, which moves in parallel by sliding of the rod 246B.

Reference numeral 274A denotes bobbins constituting a speed generator 274. Reference numeral 274B denotes a core constituting the speed generator 274. The core 274B is fixed to the connecting frame 268.

Additionally, the internal structure of the lens device 10 is not limited to that in FIG. 6. Various forms are applicable as a specific structure for suitably moving the vibration-proof lens 46 by a driving device such as an actuator.

The following will discuss the function of the lens device 10 configured thus.

As shown in FIG. 4, in the lens device 10 not connected to the camera main body 14, the lock pin 68 is in contact with the holding member 74 and the vibration-proof lens 46 is locked. Since the lens device 10 is conveyed in this state, the vibration-proof lens 46 is not moved and damaged. Further, the slide pin 62 serving as a switch for unlocking the vibration-proof lens 46 is disposed in the recess 44. Thus, the slide pin 62 is not touched by mistake during conveyance and the vibration-proof lens 46 is not unlocked. Hence, the lens device 10 can be conveyed with safe.

Beside, when the lens device 10 is attached to the camera main body 14, as shown in FIG. 5, the hook 38 presses the slide pin 62, and the slide pin 62 slides in a left direction in FIG. 5. When the slide pin 62 slides, the lock pin 68 slides in a right direction in FIG. 5 in synchronization with the slide pin 62 to unlock the vibration-proof lens 46. Namely, the vibration-proof lens 46 can be automatically unlocked simply by attaching the lens device 10 to the camera main body 14.

Additionally, when the lens device 10 is detached from the camera main body 14, the slide pin 62 pressed by the hook 38 returns to an original protruding position by energization of the spring 70 as shown in FIG. 4. Accordingly, the lock pin 68 slides in a left direction in FIG. 4 and is engaged to the holding member 74. Therefore, the vibration-proof lens 46 is locked automatically.

In this manner, by attaching the lens device 10 of the present embodiment to the camera main body 14, the vibration-proof lens 46 is unlocked automatically, and the vibration-proof lens 46 is locked again by detaching the camera main body 14. Therefore, it is not necessary to switch locking and unlocking of the vibration-proof lens 46 every time the lens device 10 is attached and detached to/from the camera main body 14, thereby enhancing operational ease. Further, when the lens device 10 is detached from the camera main body 14, the vibration-proof lens 46 is automatically locked. Hence, the lens device 10 is never left unlocked during conveyance.

Also, in the lens device 10, the slide pin 62 for switching locking and unlocking of the vibration-proof lens 46 is provided in the recess 44 of the back end face 30. Thus, it is possible to prevent an operating error during conveyance.

Here, the lock mechanism of the vibration-proof lens 46 is not limited to the above embodiment as long as the lock pin 68 moves in synchronization with the connection of the camera body 14. Therefore, for example, the following configuration is applicable: the lock pin 68 slides by the driving of the motor, a switch of the motor is provided in the recess 44, and the switch is turned on by the hook 38. Also, instead of the switch, a sensor and the like may be provided for detecting the hook 38.

Moreover, the position of the switch such as the slide pin 62 is not limited to the recess 44 as long as the position is on a joint with the camera main body 14. A contact surface may be different in shape for some kinds of cameras, and the slide pin 62 may not be pressed sufficiently. Thus, it is preferable to dispose a switch on a contact surface of the hook that is a common contact surface for all cameras.

Figure 7:
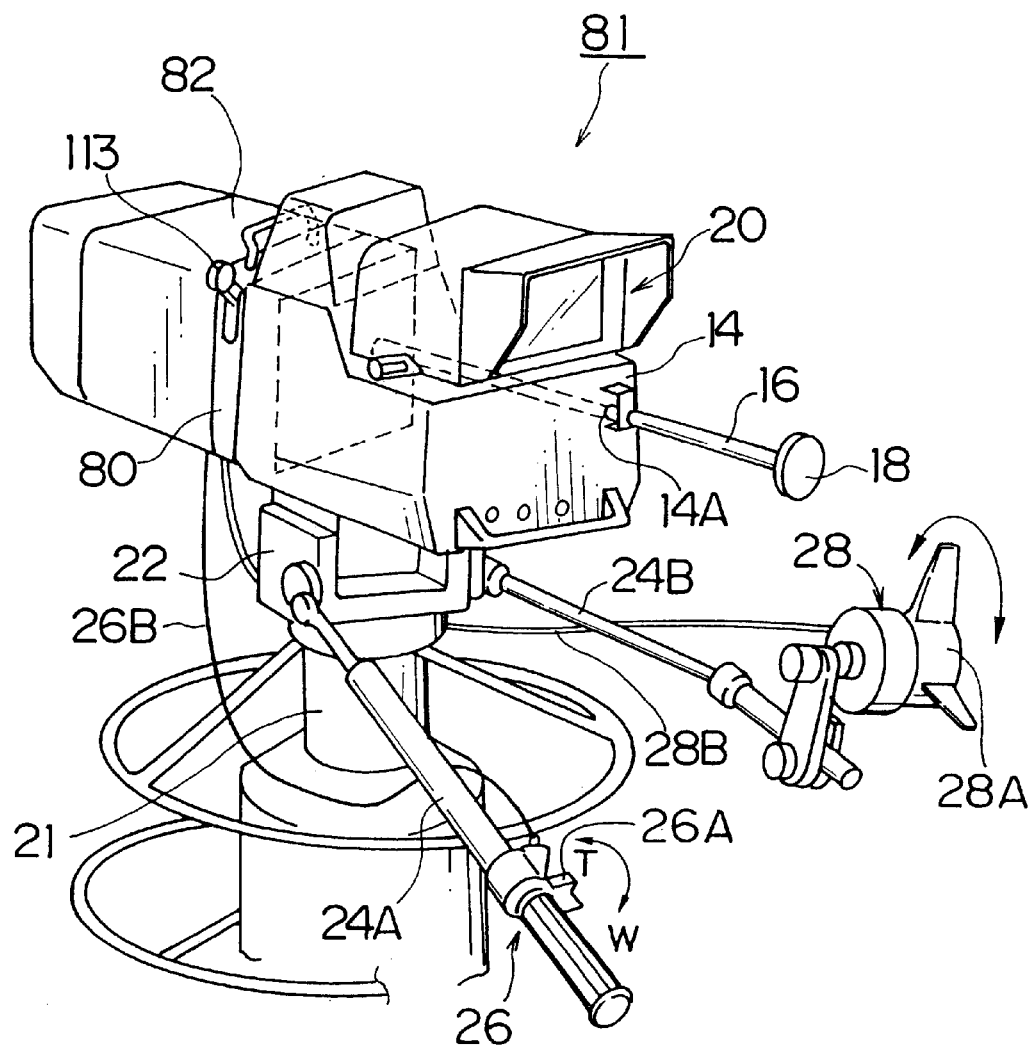
FIG. 7 is a perspective view showing a TV camera device using a vibration-proof adapter of an embodiment.

FIG. 7 shows a TV camera device 81 using a vibration-proof adapter 80 according to an embodiment of the present invention. The vibration-proof adapter 80 is attached between an EFP lens device (hereinafter, referred to as a lens device) 82 having no vibration-proof function and the camera main body 14. The camera main body 14 is configured as FIGS. 1 and 3, and the lens device 82 is similar to those in FIGS. 1 and 2 in outward appearance.

Figure 8:
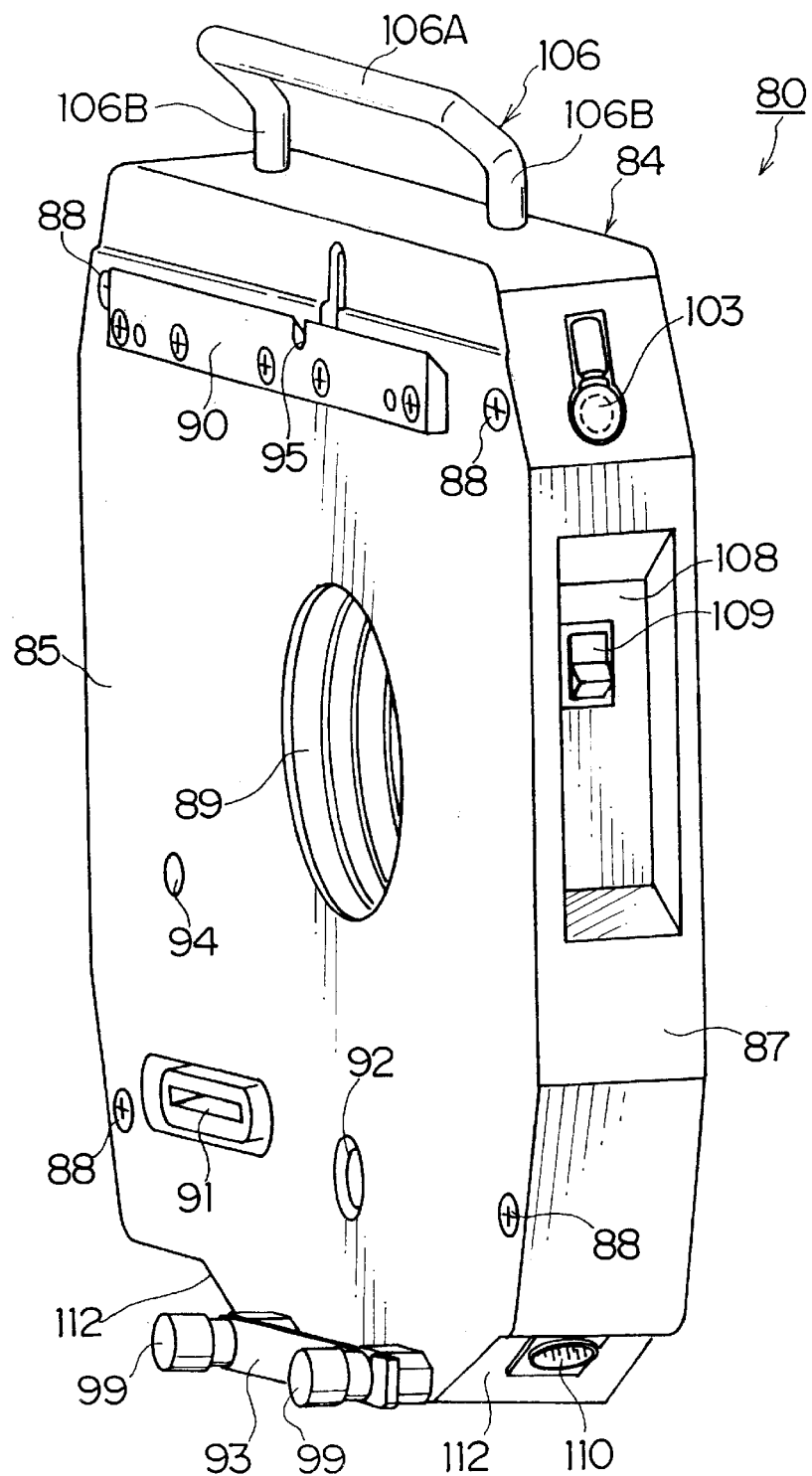
FIG. 8 is a perspective view showing a front plate of the vibration-proof adapter shown in FIG. 7.
Figure 9:
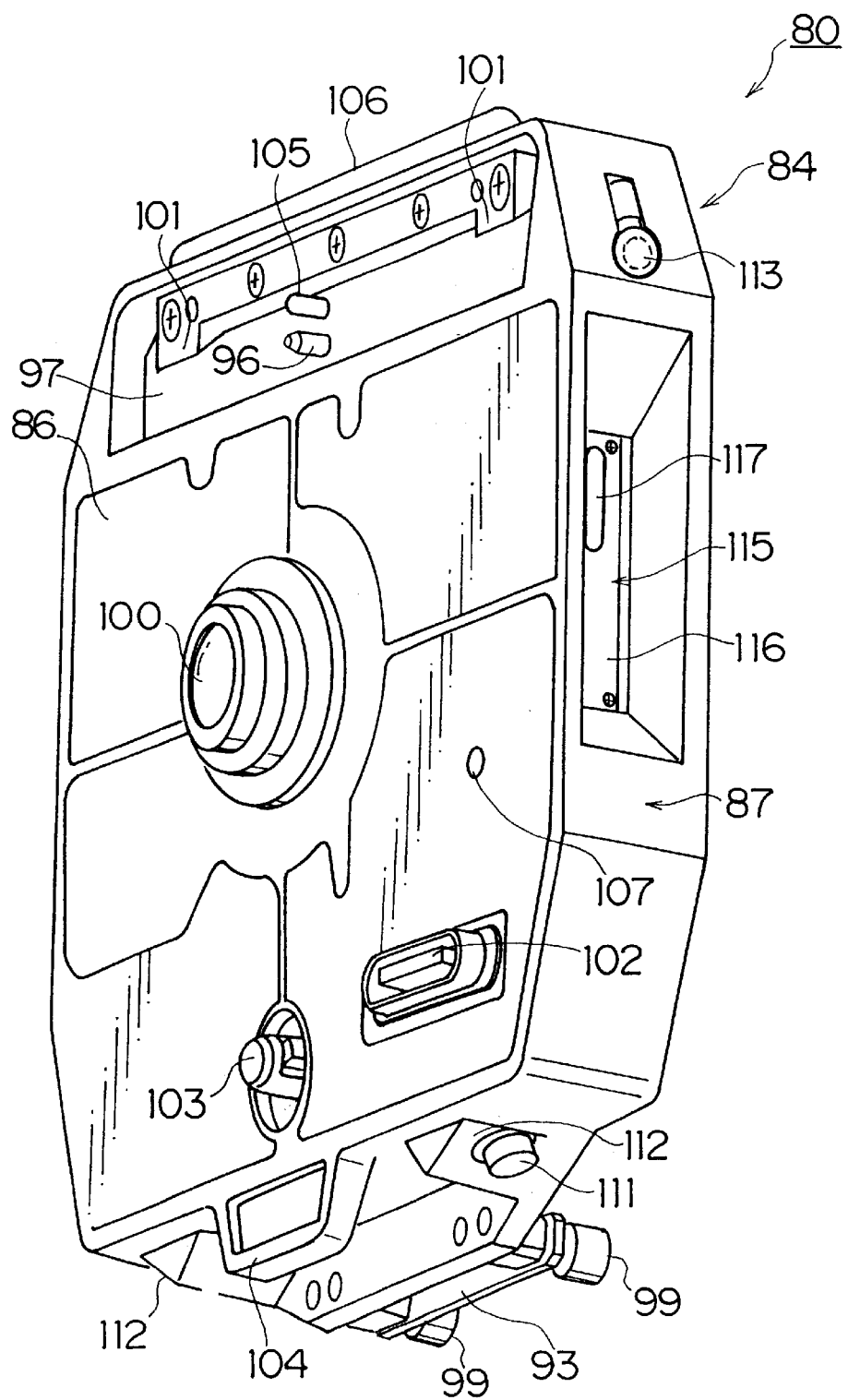
FIG. 9 is a perspective view showing a back plate of the vibration-proof adapter shown in FIG. 7.

FIGS. 8 and 9 are perspective views showing the appearance of the vibration-proof adapter 80. As shown in these drawings, a main body case 84 of the vibration-proof adapter 80 is formed into a flat box and is composed of a front plate 85, a back plate 86, and a frame body 87.

The front plate 85 in FIG. 8 is fixed on the frame body 87 of the main body case 84 by four screws 88 fastened on corners. The front plate 85 is configured as the front end face 32 of the camera main body 14 shown in FIG. 3 and can be connected to the back end face (see FIG. 2) of a lens device 82. Namely, the front plate 85 is provided with a recess 89, a hook 90, a connector 91, a recess 92, a holding plate 93, and screws 99 that are respectively identical to the recess 35, the hook 38, the connector 49, the recess 51, the holding plate 53, and the screws 59 in FIG. 3. The recess 89 is an escape part of the bayonet mount 34 (see FIG. 2) of the lens device 82. The hook 90 is engaged to the hook 36 (see FIG. 2) of the lens device 82. The connector 91 is connected to the connector 48 (see FIG. 2) of the lens device 82. The positioning pin 50 (see FIG. 2) of the lens device 82 is placed into the recess 92. The supporting plate 52 (see FIG. 2) of the lens device 82 is inserted between the holding plate 93 and the front plate 85. Since the holding plate 93 is fastened by the screws 99, the supporting plate 52 is pressed and held between the holding plate 93 and the front plate 85. Besides, reference numeral 94 in FIG. 8 denotes a through hole for inserting the operating rod 16 (see FIG. 7). Reference numeral 95 denotes a groove for inserting the positioning pin 39 (see FIG. 2) of the lens device 82. The connection between the front plate 85 of the vibration-proof adapter 80 and the back end face of the lens device 82 is made such that an optical axis of the vibration-proof adapter 80 and an optical axis of the lens device 82 conform to each other in a vertical direction by engaging the hook 90 to the hook 36, and the optical axes conform to each other in a horizontal direction by engaging pin 50 to the groove 95.

Meanwhile, the back plate 86 in FIG. 9 is formed integrally with the frame body 87. The back plate 86 is configured as the back end face (see FIG. 2) of the lens device 82 and can be connected to the front end face 32 of the camera main body 14 shown in FIG. 3. Namely, the back plate 86 is provided with a bayonet mount 100, a hook 101, a connector 102, a pin 103, and a supporting plate 104 that are respectively identical to the bayonet mount 34, the hook 36, the connector 48, the pin 50, and the supporting plate 52 in FIG. 2. The bayonet mount 100 is used when a hand-held camera such as an ENG camera is connected. Further, the hook 101 is used when the box-shaped camera main body 14 in FIG. 7 is connected. The hook 101 is engaged to the hook 38 (see FIG. 3) of the camera main body 14. The connector 102 is connected to the connector 91 in FIG. 8 via a cable (not shown) disposed in the main body case 84, and is connected to the connector 49 (see FIG. 3) of the camera main body 14. The pin 103 is placed into the recess 51 (see FIG. 3) of the camera main body 14, and the supporting plate 104 is pressed and held by the holding plate 53 (see FIG. 3) of the camera main body 14.

Additionally, reference numeral 107 in FIG. 9 denotes a through hole for inserting the operating rod 16 (see FIG. 7), and reference numeral 105 denotes a positioning pin engaged to the groove 40 (see FIG. 3) of the camera main body 14. The connection between the back plate 86 of the vibration-proof adapter 80 and the front end face 32 of the camera main body 14 is made such that an optical axis of the vibration-proof adapter 80 and an optical axis of the camera main body 14 conform to each other in a vertical direction by engaging the hook 101 to the hook 38, and the optical axes conform to each other in a horizontal direction by engaging the pin 105 to the groove 40.

A slide pin 96 serving as a switch of the vibration-proof function is provided below the hook 101. The slide pin 96 is provided so as to protrude on the bottom of the recess 97, and the slide pin 96 is pressed by the hook 38 (see FIG. 3), which is placed into the recess 97, to turn on the switch of the lock mechanism. The lock mechanism of a vibration-proof lens 98 will be discussed in detail later.

A recess 108 is formed on the right side of the frame body 87 in FIG. 8, and a power supply switch 109 is provided in the recess 108 in such a manner that the power supply switch 109 does not protrude beyond the recess 108. The power supply switch 109 is provided for turning on/off the power supply of the vibration-proof adapter 80. When the power supply switch 109 is turned on, current is fed to the circuit of the vibration-proof adapter 80 and a vibration detecting sensor is actuated.

Besides, in the event of a shortage of power supply from the camera main body 14, power supply is fed to the vibration-proof adapter 10 from an AC adapter (not shown) by connecting a cable connector of the AC adapter to a power supply connector 110, which is provided on the lower part of the frame body 87.

Turning on(valid)/off(invalid) of the vibration-proof function of the vibration-proof adapter 80 is controlled by a controller (not shown), which is connected via a cable to a connector 111 for a controller that is provided on the lower part of the frame body 87 shown in FIG. 9. Besides, the power supply connector 110 and the connector 101 for a controller are provided on outer inclined surfaces of protruding parts 112 (see FIGS. 8 and 9), which are formed into triangles in cross section on the lower part of the main body case 84.

Further, displays 113, which are provided on both of upper right and left sides of the frame body 87, display if the vibration-proof function is turned on or off. The displays 113 are provided so as to protrude on the main body case 84 and are protruded outside the main body case 84 when it is used.

Meanwhile, a recess 115 is formed on the right side of the frame body 87 shown in FIG. 9, and a lid plate 116 is detachably attached to the recess 115. Inside the lid plate 116, a group of switches (not shown) is provided. These switches act as a lens selecting switch, a pan/tilt control switch, and a test mode switch. Additionally, reference numeral 117 denotes a rubber cap for closing an opening formed on the lid plate. The group of switches is partially exposed by removing the rubber cap 117.

Figure 10:
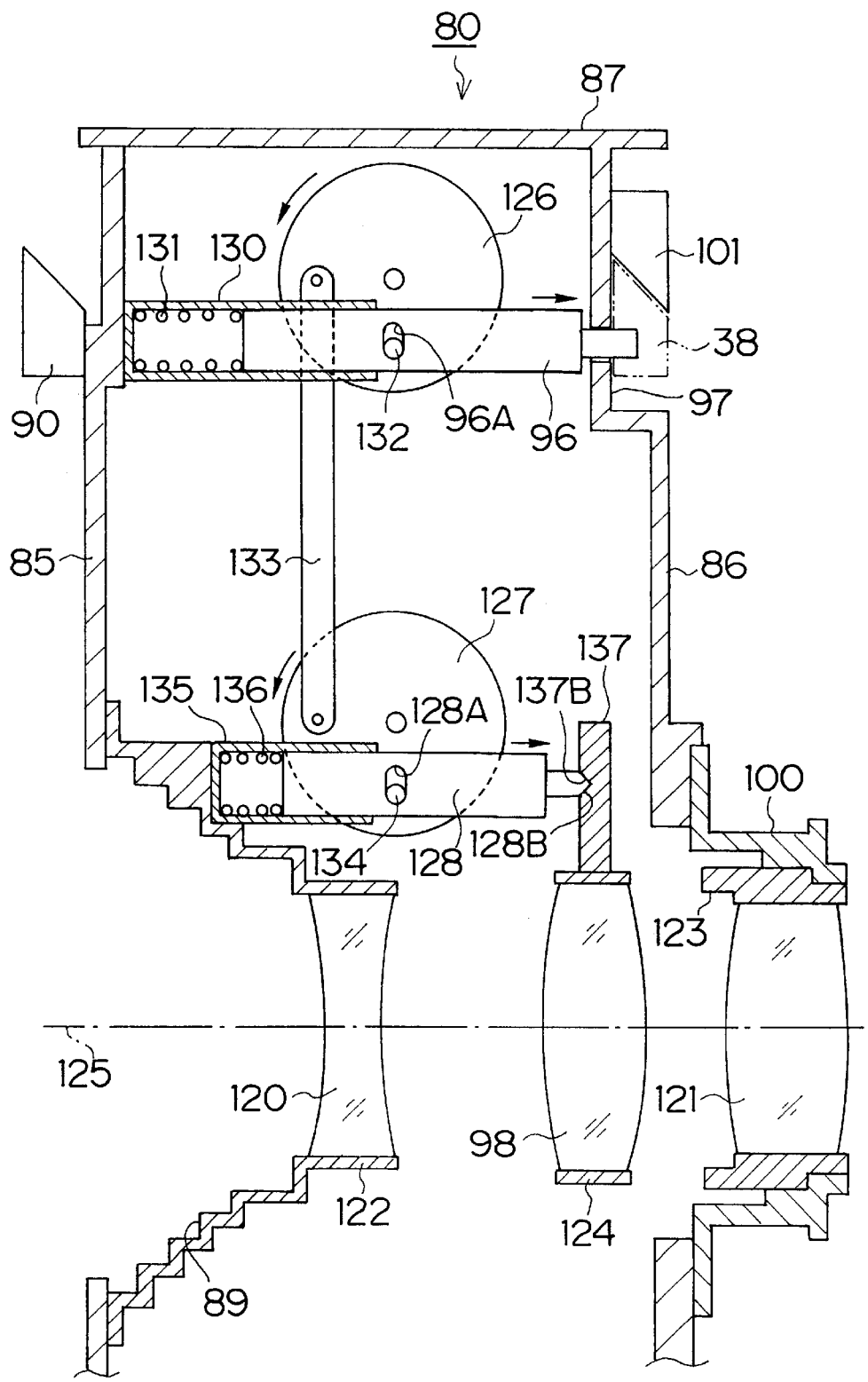
FIG. 10 is a sectional view schematically showing a lock mechanism in a state in which a vibration-proof lens is locked.
Figure 11:
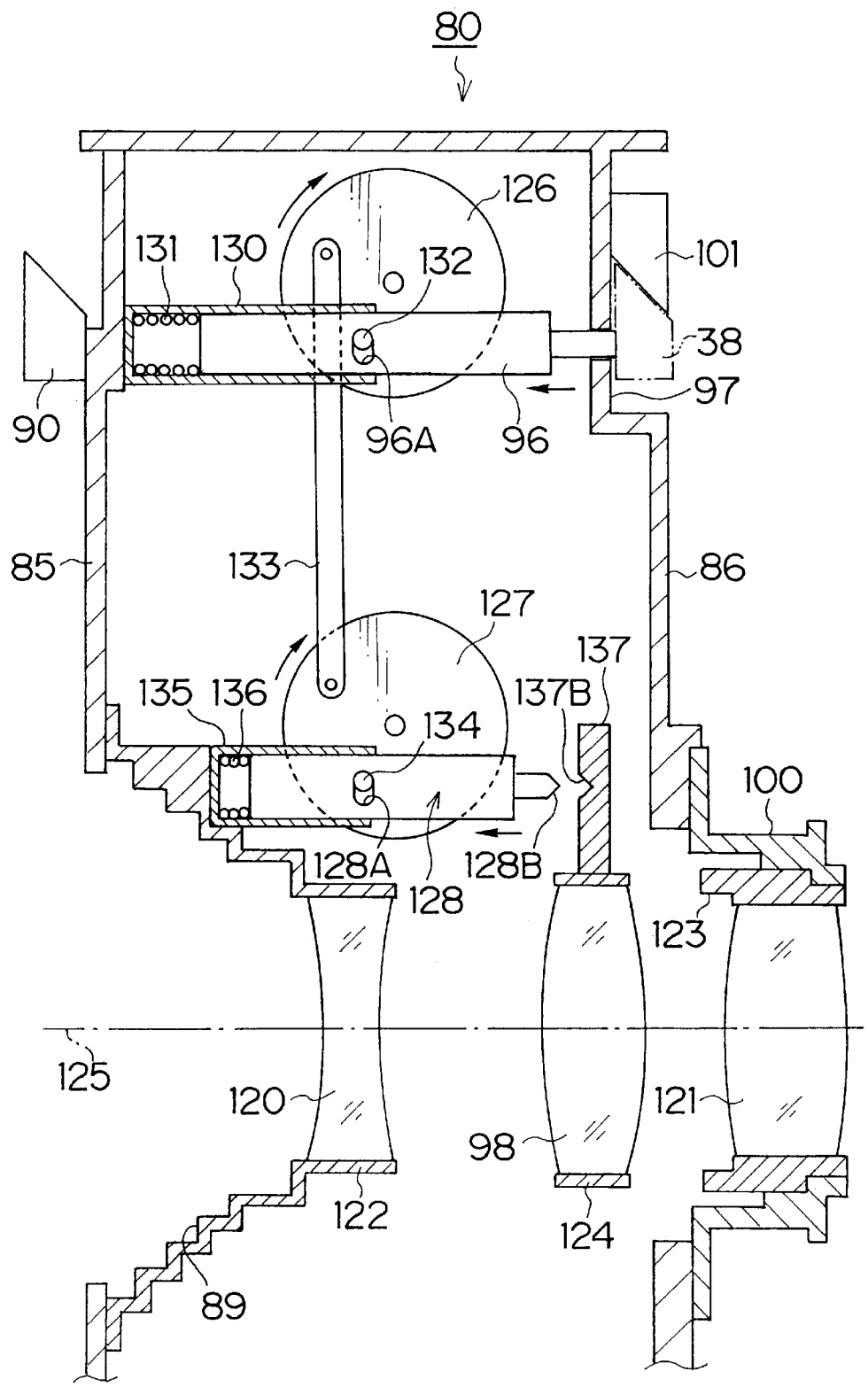
FIG. 11 is a sectional view schematically showing the lock mechanism in a state in which the vibration-proof lens is unlocked.

FIGS. 10 and 11 are sectional views schematically showing a lock mechanism of a vibration-proof lens 98. FIG. 10 shows a locking state in which the vibration-proof lens 98 is locked, and FIG. 11 shows an unlocking state in which the vibration-proof lens 98 is unlocked.

As shown in these drawings, the vibration-proof lens 98, a first fixed lens 120, and a second fixed lens 121 are provided inside the vibration-proof adapter 80.

The first fixed lens 120 is fixed to a lens frame 122. The lens frame 122 is a member formed integrally with a part constituting the recess 89. The lens frame 122 is fixed to the front plate 85.

The second fixed lens 121 is fixed to a lens frame 123 provided inside the bayonet mount 100. The bayonet mount 100 is fixed to the back plate 86.

The vibration-proof lens 98 is held by a lens frame 124 and is disposed in a space closed by the first fixed lens 120 and the second fixed lens 121. Therefore, dust and the like is not adhered to the vibration-proof lens 96, thereby maintaining high performance of the lens. The lens frame 124 is connected to a vibration-proof mechanism and is moved by the vibration-proof mechanism inside a plane perpendicular to an optical axis 125, thereby substantially correcting a blurred image. Besides, the vibration-proof mechanism is configured as FIG. 6.

The lock mechanism for locking the vibration-proof lens 98 is mainly composed of a slide pin 96, a first table 126, a second table 127, and a lock pin 128.

The slide pin 96 is guided by a guide member 130 and is supported so as to slide in a direction of the optical axis 125. A spring 131 is provided on the bottom end side of the slide pin 96, and the slide pin 96 is energized by the spring 131 in a right direction in FIG. 10. The front end of the slide pin 96 penetrates the bottom of the recess 97 of the back plate 86 and protrudes from the bottom. Therefore, as shown in FIG. 11, when the hook 38 is placed into the recess 97 and is engaged to the hook 101, the slide pin 96 is pressed inside by the hook 38 and slides in a left direction in FIG. 11. Further, as shown in FIG. 10, when the hook 38 is taken out from the recess 97, the slide pin 96 slides in a right direction by energization of the spring 131 and returns to an original protruding position. Besides, the slide pin 96 on the protruding position is placed inside the recess 97.

A groove 96A is formed in a vertical direction on the outer peripheral surface of the slide pin 96, and a pin 132 is engaged to the groove 96A. The pin 132 protrudes at an off-center position of the first table 126, which is rotatably supported. The first table 126 is connected to the second table 127 via a link rod 133. Thus, when the slide pin 96 slides, the first table 126 rotates by the engagement between the groove 96A and the pin 132, and the second table 127 rotates via the link rod 133 in synchronization with the first table 126.

A pin 134 protrudes at an off-center position of the second table 127. The pin 134 is engaged to a groove 128A formed in a vertical direction on the outer peripheral surface of a lock pin 128. The lock pin 128 is supported by a guide member 135 so as to slide in a direction of the optical axis 125, and the lock pin 128 is energized in a right direction in FIG. 11 by a spring 136 provided on the bottom end side. Therefore, according to the rotation of the second table 127, the lock pin 128 slides in parallel with the optical axis 125.

A taper 128B is formed on the front end of the lock pin 128, and the taper 128B is brought into contact with a taper 137B formed on a holding member 137 of the vibration-proof lens 98. As shown in FIG. 10, when the taper 137B and the taper 128B are in contact with each other, the vibration-proof lens 98 is fixed (locked) such that its optical axis conforms to the optical axis 125 of the fixed lenses 120 and 121. Moreover, as shown in FIG. 11, when the taper 137B and the taper 128B are separated from each other, the vibration-proof lens 98 is unlocked and can be moved inside a plane perpendicular to the optical axis 125.

As shown in FIG. 11, in the lock mechanism of the vibration-proof lens 98 that is configured thus, the slide pin 96 slides in a left direction in FIG. 11 by placing the hook 38 into the recess 97, the first table 126 and the second table 127 rotate clockwise, and the lock pin 128 slides in a left direction in FIG. 11 to unlock the vibration-proof lens 98. Further, as shown in FIG. 10, the slide pin 96 slides in a right direction in FIG. 10 by detaching the hook 38 from the recess 97, the first table 126 and the second table 127 rotate counterclockwise, and the lock pin 128 slides in a right direction in FIG. 10 to lock the vibration-proof lens 98.

Next, the following will discuss the function of the vibration-proof adapter 80 configured thus.

As shown in FIG. 10, in the vibration-proof adapter 80 not being connected to the camera main body 14, the lock pin 96 is in contact with the holding member 137, and the vibration-proof 98 is locked. Since the vibration-proof adapter 80 is conveyed in this state, the vibration-proof lens 98 is not moved and damaged. Further, the slide pin 96 serving as a switch for unlocking the vibration-proof lens 98 is disposed in the recess 97. Thus, the slide pin 96 is not touched and unlocked by mistake during conveyance. Hence, the vibration-proof adapter 80 can be conveyed with safety.

Also, when the vibration-proof adapter 80 is attached to the camera main body 14, as shown in FIG. 11, the slide pin 96 is pressed by the hook 38 and slides in a left direction in FIG. 11. When the slide pin 96 slides, the lock pin 128 slides in a left direction in FIG. 11 in synchronization with the slide pin 96 to unlock the vibration-proof lens 98. Therefore, the vibration-proof lens 98 is automatically unlocked simply by attaching the vibration-proof adapter 80 to the camera main body 14.

Additionally, when the vibration-proof adapter 80 is detached from the camera main body 14, the slide pin 96 pressed by the hook 38 returns to an original protruding position by energization of the spring 131 as shown in FIG. 10. Accordingly, the lock pin 128 slides in a right direction in FIG. 10 to press the holding member 137. Hence, the vibration-proof lens 98 is automatically locked.

As described above, in the vibration-proof adapter 80 of the present embodiment, the vibration-proof lens 98 is automatically unlocked by connecting the camera main body 14, and the vibration-proof lens 98 is locked again by detaching the camera main body 14. Thus, it is not necessary to switch locking and unlocking of the vibration-proof lens 98 every time the vibration-proof adapter 80 is attached and detached to/from the camera main body 14, thereby enhancing operational ease. Moreover, the vibration-proof lens 98 is locked automatically when the vibration-proof adapter 80 is detached from the camera main body 14. Hence, the vibration-proof adapter 80 is never left unlocked during conveyance.

Also, in the vibration-proof adapter 80, the slide pin 96 for switching locking and unlocking of the vibration-proof lens 98 is disposed in the recess 97 of the back plate 86. Thus, it is possible to prevent an operating error during conveyance.

Figure 12:
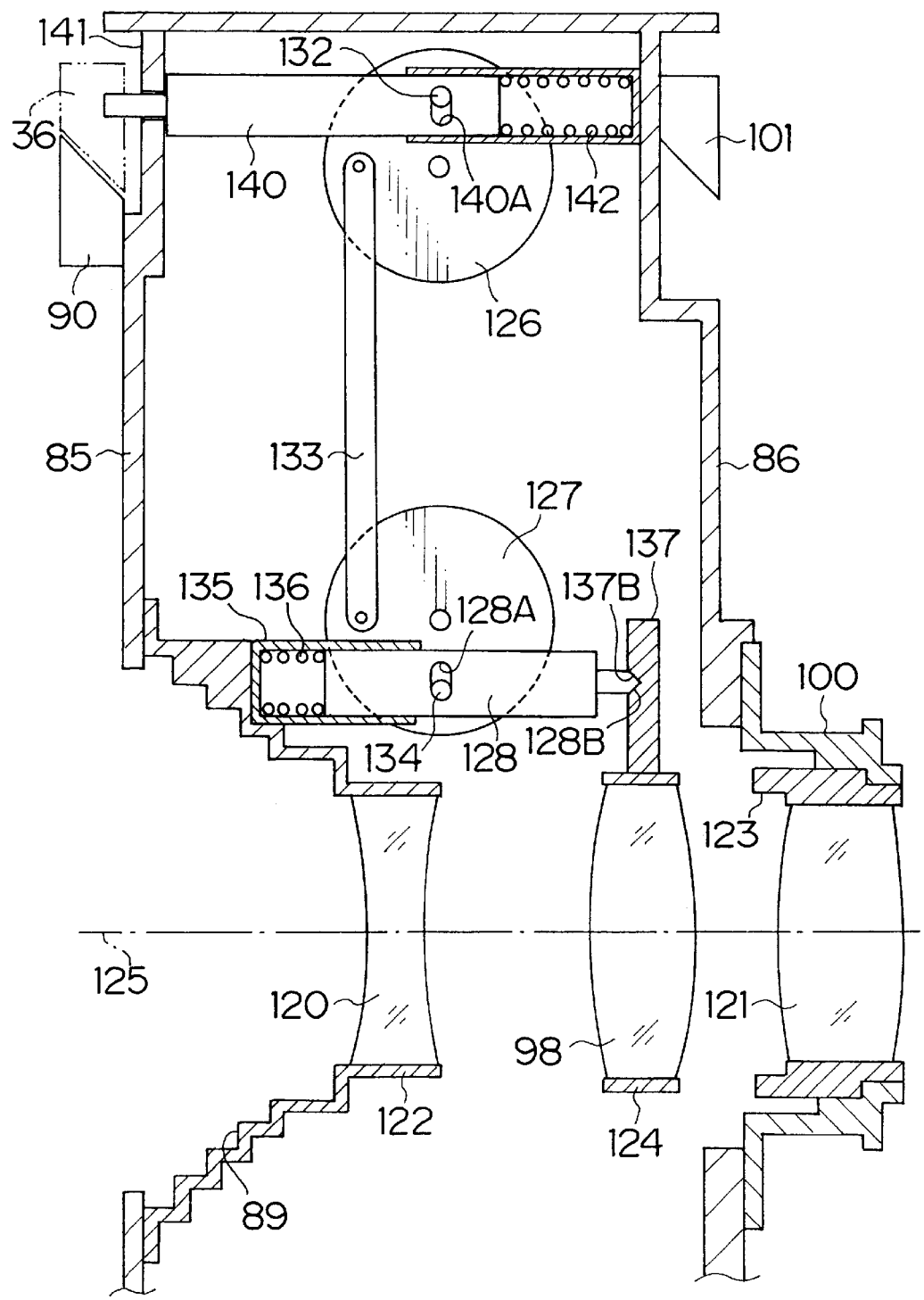
FIG. 12 is a sectional view schematically showing a lock mechanism having a switch at a different position from FIG. 10.

Beside, in the above-mentioned embodiment, the connection of the camera main body 14 is detected by the slide pin 96 and the vibration-proof lens 98 is unlocked. As shown in FIG. 12, the connection of the lens device 82 may be detected. A lock pin 140 in FIG. 12 is energized by a spring 142 in a left direction in FIG. 12, and the front end of the lock pin 140 is provided in a recess 141 of the front plate 85 so as to protrude. On the outer peripheral surface of the lock pin 140, a groove 140A engaged to the pin 132 is formed in a vertical direction.

In the lock mechanism configured thus, when the hook 36 is inserted into the recess 141 and is engaged to the hook 90, the hook 36 presses the slide pin 140, and the slide pin 140 slides in a right direction in FIG. 12. Accordingly, the first table 126 and the second table 127 rotate clockwise, and the lock pin 128 slides in a left direction in FIG. 12 to unlock the vibration-proof lens 98.

Moreover, when the hook 36 is detached from the recess 141, the slide pin 140 pressed by the hook 36 returns to an original protruding position, the first table 126 and the second table 127 rotate counterclockwise, and the lock pin 128 is brought into contact with the holding member 137 to lock the vibration-proof lens 98.

As described above, in the vibration-proof adapter in FIG. 12, the vibration-proof lens 98 is automatically unlocked by connecting the lens device 82, and the vibration-proof lens 98 is automatically locked by detaching the lens device 82. Therefore, it is not necessary to operate the lock mechanism of the vibration-proof lens 98, operational ease is enhanced, an operating error is prevented during conveyance, and safety is improved.

The following will discuss a grip provided on the vibration-proof adapter according to the present embodiment of the present invention.

Figure 13:
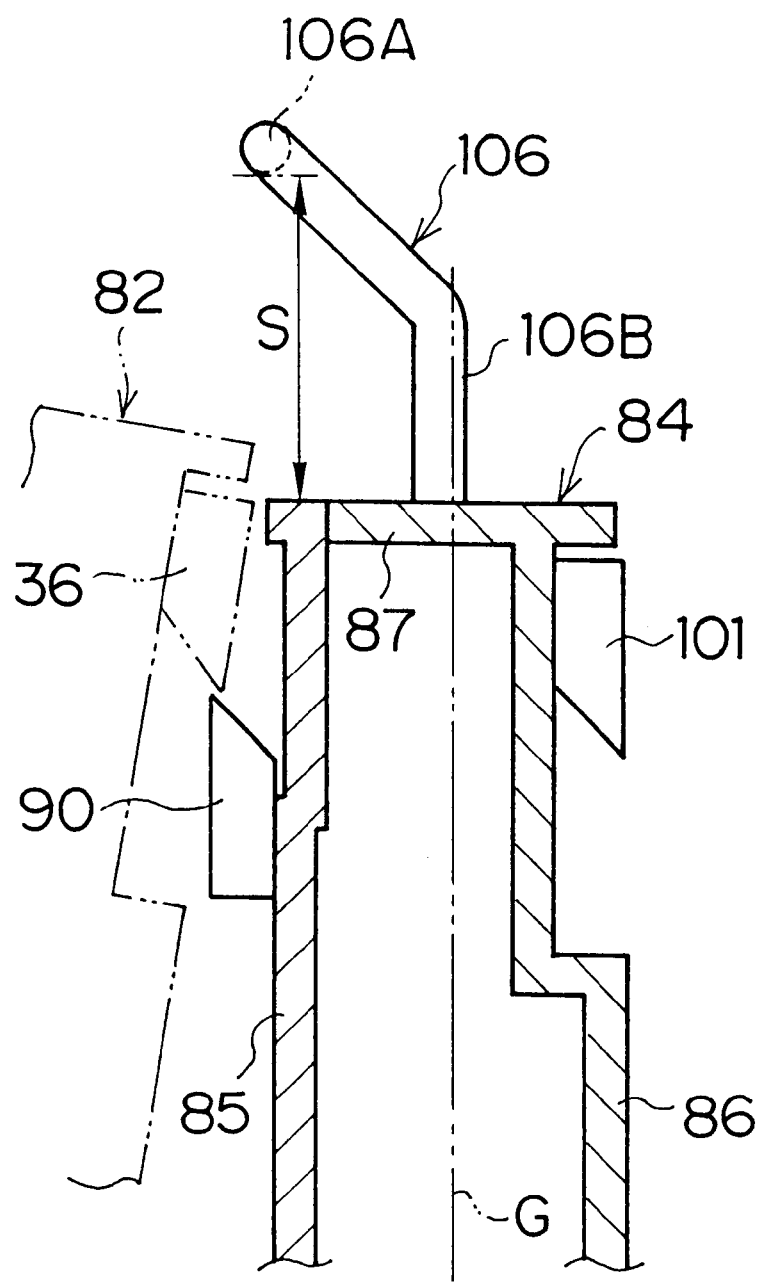
FIG. 13 is a side view showing a grip.
Figure 14:
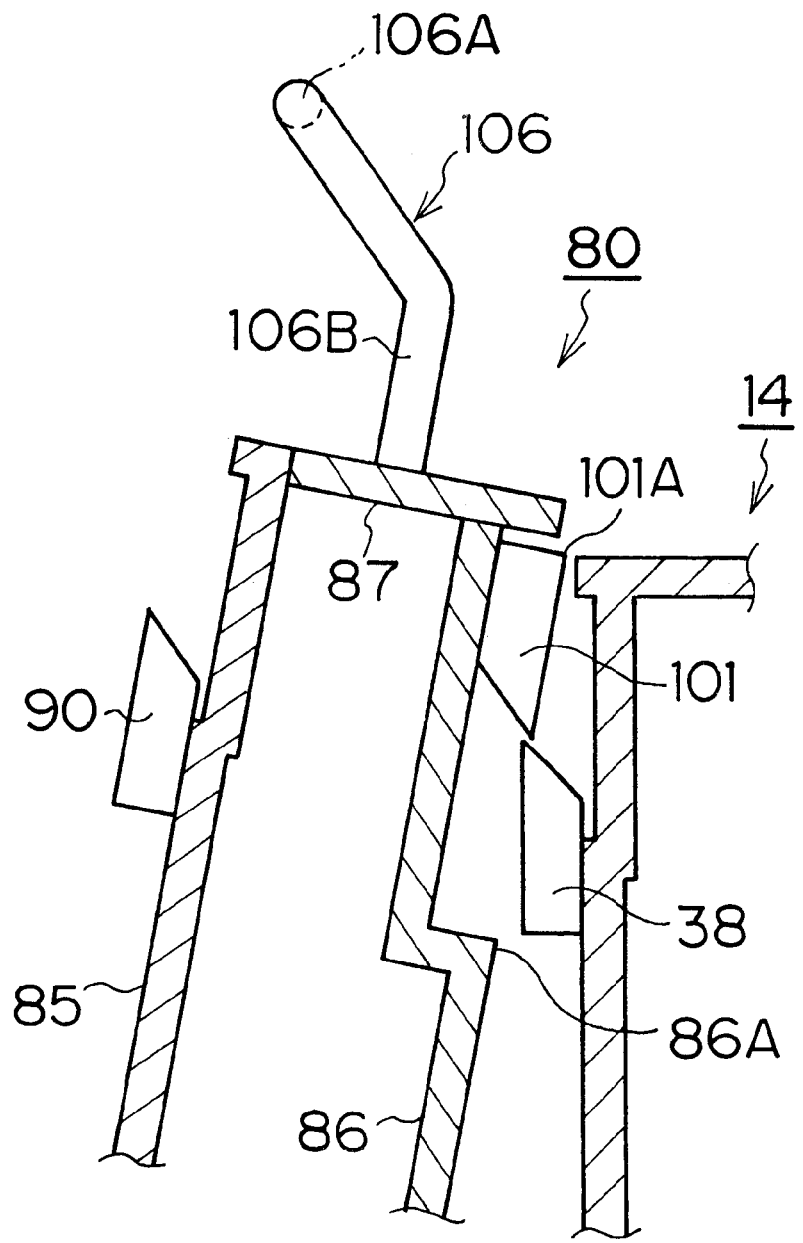
FIG. 14 is a side view showing the grip in a state in which a gripping part in FIG. 13 is held and lifted.

As shown in FIG. 8, a grip 106, which is used when the vibration-proof adapter 80 is attached, is provided on the upper surface of the frame body 87 of the main body case 84. The grip 106 has a flat gripping part 106A, which is held by a hand of an operator. Both ends of the gripping part 106A are connected to the upper surface of the main body case 84 via connecting parts 106B. As shown in FIG. 13, the connecting parts 106B are connected substantially to the center of the main body case 84 in a thickness direction of the main body case 84, and the upper end (that is, the gripping part 106A) is bent to the above of the lens device 82 (left side in FIG. 13). Therefore, the gripping part 106A is disposed above the hook 90. Namely, the gripping part 106A is shifted above to the lens device 82 from a center of gravity of the vibration-proof adapter 80 that is disposed on an extended chain double-dashed line G in FIG. 13. Hence, when the gripping part 106A is held and lifted by a hand, as shown in FIG. 14, the vibration-proof adapter 80 is lifted while the lower part is inclined to the lens device 82.

Further, as shown in FIG. 13, a space S serving as a space for attaching and detaching the lens device 82 is provided between the gripping part 106A of the grip 106 and the upper surface of the main body case 84. Therefore, when the hook 36 of the lens device 82 is engaged above to the hook 90 of the vibration-proof adapter 80, the lens device 82 is connected to the vibration-proof adapter 80 without being in contact with the gripping part 106A. Further, when the connected lens device 82 is lifted, the engagement between the hook 90 and the hook 36 can be released without bringing the lens device 82 into contact with the gripping part 106A.

When the vibration-proof adapter 80 is attached to the camera main body 14, first, an operator holds the gripping part 106A of the grip 106 to lift the vibration-proof adapter 80. As shown in FIG. 13, the gripping part 106A of the grip 106 is shifted above to the lens device 82 from the center of gravity of the vibration-proof adapter 80. Therefore, when the gripping part 106A is held, the vibration-proof adapter 80 is lifted while the lower part is inclined to the lens device 82 as shown in FIG. 14.

Next, the vibration-proof adapter 80 is lifted as it is, and the hook 101 of the vibration-proof adapter 80 is engaged to the hook 38 of the camera main body 14. At this moment, since the vibration-proof adapter 80 is inclined, the tapered front end of the hook 38 and the tapered front end of the hook 101 are readily engaged to each other. Namely, when the vibration-proof adapter 80 is not inclined, an edge 101A (see FIG. 4) of the hook 101 and an edge 86A of the back plate 86 are brought into contact with the camera main body 14. Hence, the hook 101 and the hook 38 cannot be readily engaged to each other. Meanwhile, since the vibration-proof adapter 80 of the present embodiment is lifted while being inclined, the hook 101 and the hook 38 can be engaged to each other without bringing the edge 101A and the edge 86A into contact with the camera main body 14. Therefore, it is possible to enhance operational ease of connecting the vibration-proof adapter 80 to the camera main body 14. Besides, the gripping part 106A of the grip 106 is shifted above to the lens device 82 from the center of gravity of the vibration-proof adapter 80 in an attaching posture. It is not necessary to incline the vibration-proof adapter 80 because the vibration-proof adapter 80 is inclined simply by holding and lifting the gripping part 106A of the grip 106. Therefore, the hook 101 of the vibration-proof adapter 80 can be readily engaged to the hook 38 of the camera main body 14, thereby enhancing operational ease. Further, it is not necessary to hold a part other than the gripping part 106A of the grip 106 upon attachment. Hence, a hand is not caught between the camera main body 14 and the vibration-proof adapter 80, thereby improving safety of the vibration-proof adapter 80.

As described above, according to the vibration-proof adapter 80 of the present embodiment, since the grip 106 is disposed on the upper surface of the main body case 84, an operator can grip the vibration-proof adapter 80 by holding the grip 106, thereby enhancing operational ease.

Further, according to the present embodiment, since a space S for attaching and detaching the lens device 82 is provided below the gripping part 106A of the grip 106, when the hook 36 of the lens device 82 is engaged to the hook 90 of the vibration-proof adapter 80 or when the hook 36 is disengaged, the lens device 82 is not in contact with the grip 106. Therefore, the lens device 82 can be readily connected to the vibration-adapter 80.

Additionally, the grip 106 is bent in the above-mentioned embodiment. The form of the grip 106 is not limited to the above. For example, the following configuration is also applicable: the grip 106 on the upper surface of the main body case 84 is formed straight, another grip (not shown) is provided on the lower surface of the main body case 84, and both of the grips are held. Further, in the case of two grips provided on and under the main body case 84, when the grip is bent, the vibration-proof adapter 80 can be lifted in arbitrary posture. Hence, the hook 101 of the vibration-proof adapter 80 can be more readily engaged to the hook 38 of the camera main body 14.

Figure 15:
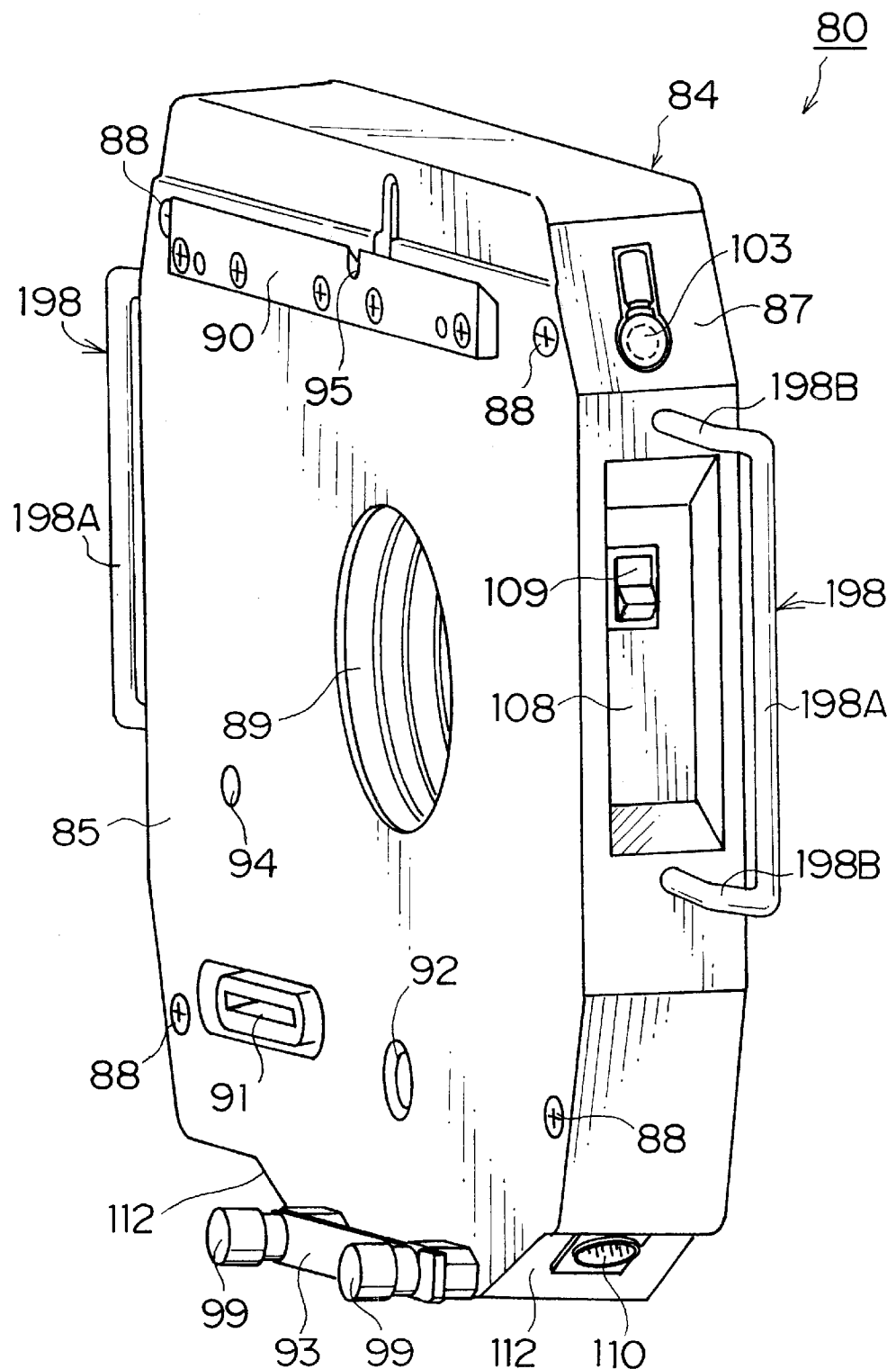
FIG. 15 is a perspective view showing a vibration-proof adapter having a grip on the side of a main body case.

Moreover, as shown in FIG. 15, grips 198 may be provided on both sides of the main body case 84. In this case, the ends of columns 198B are bent to the camera main body 14 or the lens device 82 such that the gripping parts 198A of the grips 198 do not overlap the power supply switch 109 and rubber cap 117 (see FIG. 9). Thus, when the power supply switch 109 is operated and the rubber cap 117 is attached and detached, the grips 198 do not become an obstruction.

Also, in the above-mentioned embodiment, the grip 106 and the grips 198 are fixed to the main body case 84. The configuration is not limited to the above. For example, the grip 106 and the grips 198 may be detachably attached to the main body case 84 and may be removed when they are not used.

Figure 16:
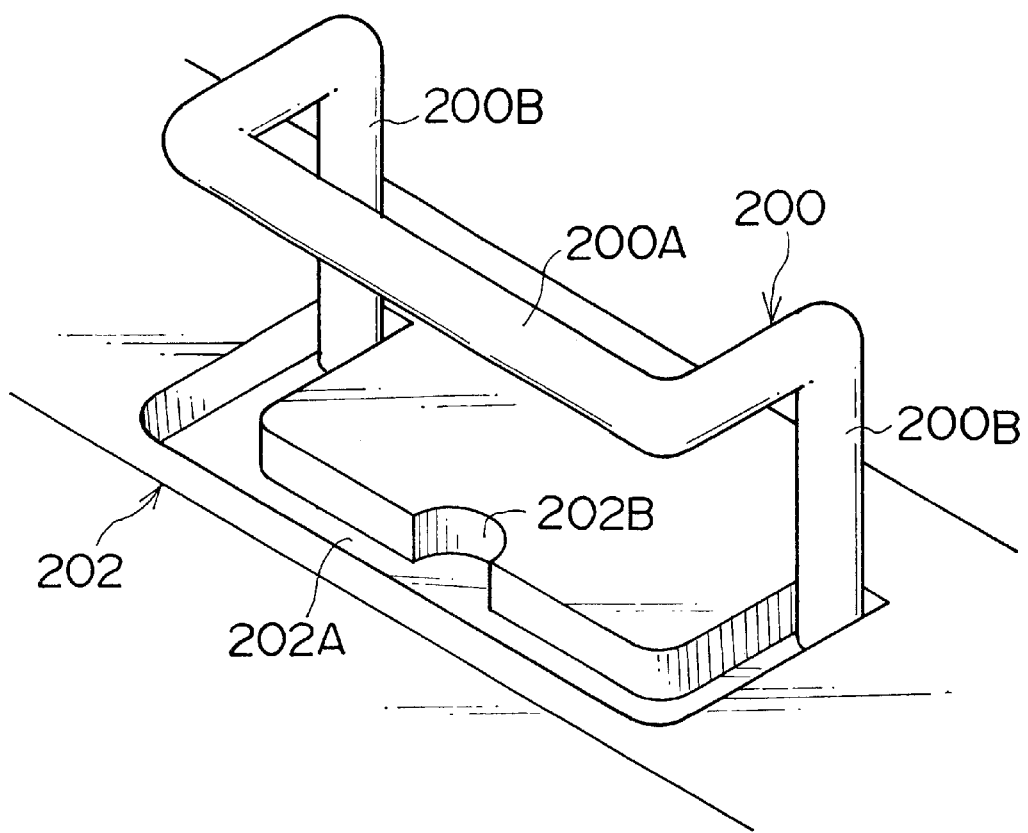
FIG. 16 is a perspective view showing an example of a retractable grip.
Figure 17:
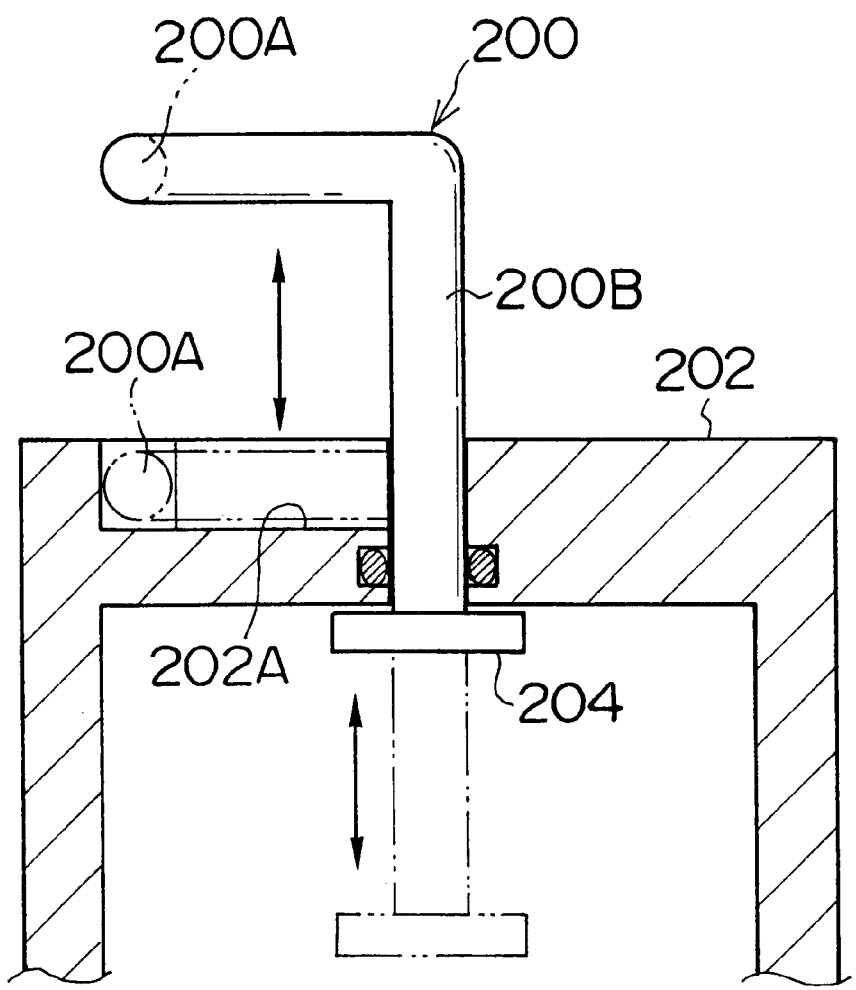
FIG. 17 is a sectional side view showing the grip in FIG. 16.

Besides, as shown in FIGS. 16 and 17, a retractable grip 200 may be provided, which can be retracted in a main body case 202. Connecting parts 200B of the grip 200 are supported on the main body case 202 so as to slide and have fall-out preventing members 204 on the lower end. The upper ends of the connecting parts 200B are bent at 90°. Moreover, on the main body case 202, a groove 202A is formed to receive the gripping part 200A of the grip 200 and the upper ends of the connecting parts 200B. On the grip 200 configured thus, as indicated by a chain double-dashed line in FIG. 17, the gripping part 200A and the upper parts of the connecting parts 200B are retracted in the groove 202A by pushing the connecting parts 200B inside the main body case 202. Therefore, the grip 200 does not protrude from the main body case 202. Thus, the grip 200 does not become an obstacle. Besides, when the lens device 82 is attached to the vibration-proof adapter 80, the grip 200 does not become an obstruction. When the grip 200 is used, a finger is inserted into a finger-putting part 202B of the groove 202A and the gripping part 200A is pulled out upward by the finger. The pulled out gripping part 200A is shifted above to the lens device 82 from the center of gravity of the vibration-proof adapter 80. Therefore, the vibration-proof adapter 80 can be lifted while being inclined by holding the gripping part 200A.

Figure 18:
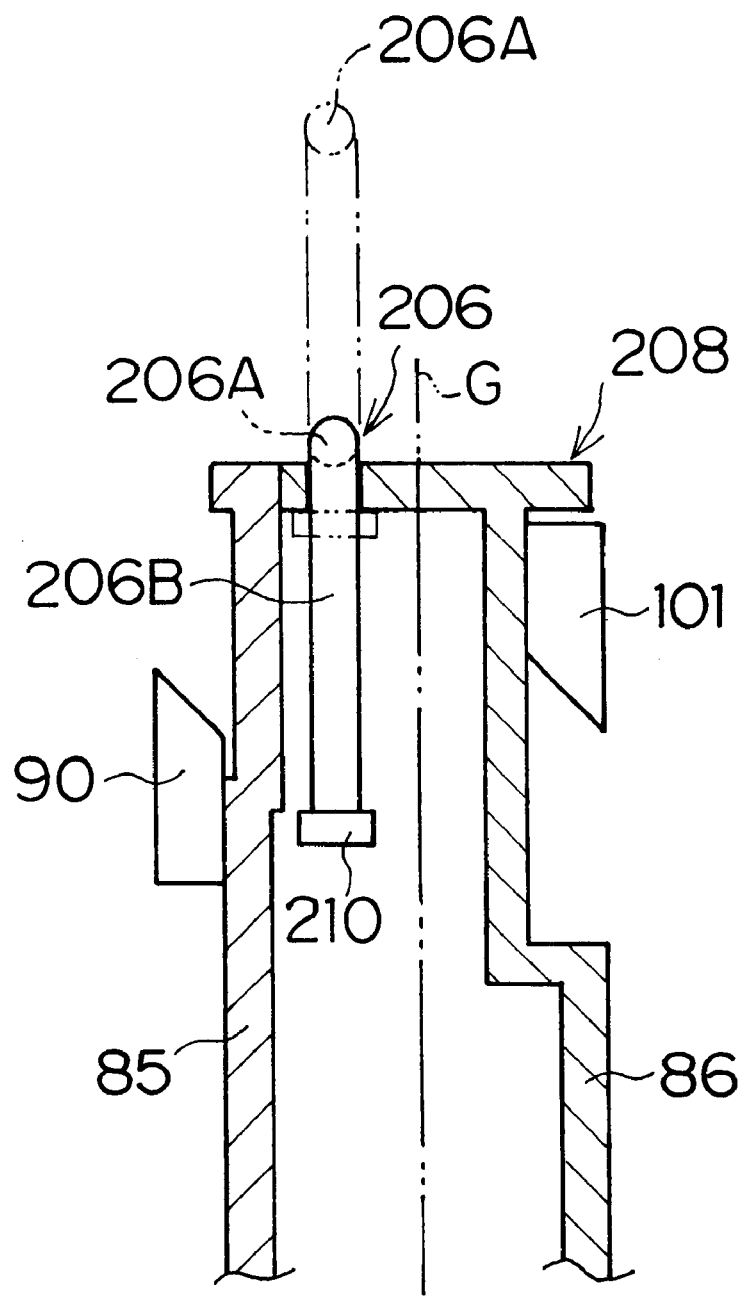
FIG. 18 is a sectional side view showing another example of a retractable grip.

Besides, a grip 206 in FIG. 18 is also applicable. The grip 206 in FIG. 18 has connecting parts 206B, which are disposed on the left side of the chain double-dashed line G (that is, on the side of the lens device 82) so as to slide on the main body case 208. The connecting parts 206B are formed straight and have fall-out preventing members 210 on the lower ends. On the grip 206 formed thus, the connecting parts 206B can be retracted in the main body case 208 by pushing the gripping part 206A inside the main body case 208 and engaging the gripping part 206A to the main body case 208. Further, when the gripping part 206A is held and pulled outward, the grip 206 protrudes from the main body case 208. At this moment, the gripping part 206A is shifted from the center of gravity of the vibration-proof adapter 80 to the lens device 82. Thus, the vibration-proof adapter 80 can be lifted while being inclined.

In the above-mentioned embodiment, the vibration-proof adapter is firstly attached to the camera main body, and then, the lens device is attached. The vibration-proof adapter may be attached to the lens device before the lens device is attached to the camera main body. In this case, the grip is not formed straight on and under the vibration-proof adapter or on the right and left of the vibration-proof adapter. When the grip is bent, the grip is shifted from the center of gravity of the vibration-proof adapter to the camera main body.

As described above, according to the lens device of the present invention, since the switch of the lock mechanism is provided on the joint for connecting the camera main body, the switch of the lock mechanism is automatically operated according to attachment and detachment of the camera main body, thereby enhancing operational ease of the lock mechanism.

Besides, according to the lens device of the present invention, since the switch of the lock mechanism is provided on the recess of the joint, an operating error can be prevented in the lock mechanism.

Further, according to the vibration-proof adapter of the present invention, the switch of the lock mechanism is provided on the joint of the camera main body and the lens device. Thus, the switch of the lock mechanism is automatically operated according to attachment and detachment of the camera main body and the lens device, thereby enhancing operational ease of the lock mechanism.

Moreover, according to the vibration-proof adapter of the present invention, since the switch of the lock mechanism is provided in the recess of the joint, an operating error can be prevented in the lock mechanism.

Furthermore, according to the vibration-proof adapter of the present invention, the grip is provided on the joint with the camera or the lens device. Hence, a hand is not caught between the vibration-adapter and the camera or between the vibration-adapter and the lens device, thereby improving safety.

Besides, the gripping part of the grip is shifted from the center of gravity of the vibration-proof adapter to the lens device or the camera. Thus, the vibration-proof adapter is lifted while being inclined and is connected to the camera or the lens device with ease.

Additionally, since the grip can be retracted in the receiving part of the main body case when it is not used, it is possible to prevent the grip from being an obstacle and being in contact with the lens device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens device to be connected to a camera main body, the lens device correcting a blurred image resulted from vibration of the camera main body, the lens device comprising:

a lens barrel;

a vibration-proof lens movably arranged in the lens barrel, the vibration-proof lens being moved to correct the blurred image;

a joint with which the lens device is connected to the camera main body; and a lock mechanism for automatically unlocking and locking the vibration-proof lens without a user performing an unlocking operation or a locking operation each time the vibration-proof lens is connected or disconnected, the lock mechanism having a switch which detects connection and disconnection of the joint with the camera main body, wherein the lock mechanism automatically unlocks the vibration-proof lens when the switch detects the connection of the joint with the camera main body, and the lock mechanism automatically locks the vibration-proof lens when the switch detects the disconnection of the joint from the camera main body.

2. The lens device according to claim 1, wherein the switch is provided in a recess formed on the joint.

3. A vibration-proof adapter to be connected between a camera main body and a lens device, the vibration-proof adapter correcting a blurred image resulted from vibration of at least one of the camera main body and the lens device, the vibration-proof adapter comprising:

- a lens barrel;
- a vibration-proof lens movably arranged in the lens barrel, the vibration-proof lens being moved to correct the blurred image;
- a joint with which the vibration-proof adapter is connected to the camera main body; and
- a lock mechanism for automatically unlocking and locking the vibration-proof lens without a user performing an unlocking or a locking operation each time the vibration-proof lens is connected or disconnected, the lock mechanism having a switch which detects connection and disconnection of the joint with the camera main body,
- wherein the lock mechanism automatically unlocks the vibration-proof lens when the switch detects the connection of the joint with the camera main body, and the lock mechanism automatically locks the vibration-proof lens when the switch detects the disconnection of the joint from the camera main body.

4. The vibration-proof adapter according to claim 3, wherein the switch is provided in a recess formed on the joint.

5. A vibration-proof adapter to be connected between a camera main body and a lens device, the vibration-proof adapter correcting a blurred image resulted from vibration of at least one of the camera main body and the lens device, the vibration-proof adapter comprising:

- a lens barrel;
- a vibration-proof lens movably arranged in the lens barrel, the vibration-proof lens being moved to correct the blurred image;
- a joint with which the vibration-proof adapter is connected to the lens device; and
- a lock mechanism for automatically unlocking and locking the vibration-proof lens a user performing an unlocking operation or a locking operation each time the vibration-proof lens is connected or disconnected, the lock mechanism having a switch which detects connection and disconnection of the joint with the lens device,
- wherein the lock mechanism automatically unlocks the vibration-proof lens when the switch detects the connection of the joint with the lens device, and the lock mechanism automatically locks the vibration-proof lens when the switch detects the disconnection of the joint from the lens device.

6. The vibration-proof adapter according to claim 5, wherein the switch is provided in a recess formed on the joint.

* * * * *